US010635863B2

(12) United States Patent
de Vrieze et al.

(10) Patent No.: US 10,635,863 B2
(45) Date of Patent: Apr. 28, 2020

(54) FRAGMENT RECALL AND ADAPTIVE AUTOMATED TRANSLATION

(71) Applicant: SDL Inc., Wakefield, MA (US)

(72) Inventors: Erik de Vrieze, Kapellen (BE); Keith Mills, Binfield (GB)

(73) Assignee: SDL Inc., Wakefield, MA (US)

( * ) Notice: Subject to any disclaimer, the term of this patent is extended or adjusted under 35 U.S.C. 154(b) by 136 days.

(21) Appl. No.: 15/797,974

(22) Filed: Oct. 30, 2017

(65) Prior Publication Data
US 2019/0129946 A1    May 2, 2019

(51) Int. Cl.
G06F 40/58    (2020.01)
G06F 40/45    (2020.01)

(52) U.S. Cl.
CPC ............. *G06F 40/58* (2020.01); *G06F 40/45* (2020.01)

(58) Field of Classification Search
USPC ......................................................... 704/2–7
See application file for complete search history.

(56) References Cited

U.S. PATENT DOCUMENTS

| | | |
|---|---|---|
| 4,661,924 A | 4/1987 | Okamoto et al. |
| 4,674,044 A | 6/1987 | Kalmus et al. |
| 4,677,552 A | 6/1987 | Sibley, Jr. |
| 4,789,928 A | 12/1988 | Fujisaki |
| 4,845,658 A | 7/1989 | Gifford |
| 4,903,201 A | 2/1990 | Wagner |
| 4,916,614 A | 4/1990 | Kaji et al. |
| 4,920,499 A | 4/1990 | Skeirik |
| 4,962,452 A | 10/1990 | Nogami et al. |
| 4,992,940 A | 2/1991 | Dworkin |
| 5,005,127 A | 4/1991 | Kugimiya et al. |
| 5,020,021 A | 5/1991 | Kaji et al. |
| 5,075,850 A | 12/1991 | Asahioka et al. |
| 5,093,788 A | 3/1992 | Shiotani et al. |
| 5,111,398 A | 5/1992 | Nunberg et al. |
| 5,140,522 A | 8/1992 | Ito et al. |

(Continued)

FOREIGN PATENT DOCUMENTS

| | | |
|---|---|---|
| AU | 5240198 A | 5/1998 |
| AU | 694367 B2 | 7/1998 |

(Continued)

OTHER PUBLICATIONS

First Examination Report dated Nov. 26, 2009 for European Patent Application 05772051.8, filed May 8, 2006, 8 pages.

(Continued)

*Primary Examiner* — Leonard Saint Cyr
(74) *Attorney, Agent, or Firm* — Carr & Ferrell LLP

(57) ABSTRACT

Fragment recall and adaptive automated translation are disclosed herein. An example method includes determining that an exact or fuzzy match for a portion of a source input cannot be found in a translation memory, performing fragment recall by matching subsegments in the portion against one or more whole translation units stored in the translation memory, and matching subsegments in the portion against corresponding one or more subsegments inside the one or more matching whole translation units, and returning any of the one or more matching whole translation units and the one or more matching subsegments as a fuzzy match, as well as the translations of those subsegments.

16 Claims, 11 Drawing Sheets

(56) References Cited

U.S. PATENT DOCUMENTS

| | | |
|---|---|---|
| 5,146,405 A | 9/1992 | Church |
| 5,168,446 A | 12/1992 | Wiseman |
| 5,224,040 A | 6/1993 | Tou |
| 5,243,515 A | 9/1993 | Lee |
| 5,243,520 A | 9/1993 | Jacobs et al. |
| 5,283,731 A | 2/1994 | Lalonde et al. |
| 5,295,068 A | 3/1994 | Nishino et al. |
| 5,301,109 A | 4/1994 | Landauer et al. |
| 5,325,298 A | 6/1994 | Gallant |
| 5,349,368 A | 9/1994 | Takeda et al. |
| 5,351,189 A | 9/1994 | Doi |
| 5,408,410 A | 4/1995 | Kaji |
| 5,418,717 A | 5/1995 | Su et al. |
| 5,423,032 A | 6/1995 | Byrd et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,541,836 A | 7/1996 | Church et al. |
| 5,548,508 A | 8/1996 | Nagami |
| 5,555,343 A | 9/1996 | Luther |
| 5,587,902 A | 12/1996 | Kugimiya |
| 5,640,575 A | 6/1997 | Maruyama et al. |
| 5,642,522 A | 6/1997 | Zaenen et al. |
| 5,644,775 A | 7/1997 | Thompson et al. |
| 5,687,384 A | 11/1997 | Nagase |
| 5,708,780 A | 1/1998 | Levergood et al. |
| 5,708,825 A | 1/1998 | Sotomayor |
| 5,710,562 A | 1/1998 | Gormish et al. |
| 5,715,314 A | 2/1998 | Payne et al. |
| 5,715,402 A | 2/1998 | Popolo |
| 5,724,424 A | 3/1998 | Gifford |
| 5,724,593 A | 3/1998 | Hargrave, III et al. |
| 5,751,957 A | 5/1998 | Hiroya et al. |
| 5,764,906 A | 6/1998 | Edelstein et al. |
| 5,765,138 A | 6/1998 | Aycock et al. |
| 5,794,219 A | 8/1998 | Brown |
| 5,799,269 A | 8/1998 | Schabes et al. |
| 5,802,502 A | 9/1998 | Gell et al. |
| 5,802,525 A | 9/1998 | Rigoutsos |
| 5,812,776 A | 9/1998 | Gifford |
| 5,818,914 A | 10/1998 | Fujisaki |
| 5,819,265 A | 10/1998 | Ravin et al. |
| 5,826,244 A | 10/1998 | Huberman |
| 5,842,204 A | 11/1998 | Andrews et al. |
| 5,844,798 A | 12/1998 | Uramoto |
| 5,845,143 A | 12/1998 | Yamauchi et al. |
| 5,845,306 A | 12/1998 | Schabes et al. |
| 5,848,386 A | 12/1998 | Motoyama |
| 5,850,442 A | 12/1998 | Muftic |
| 5,850,561 A | 12/1998 | Church et al. |
| 5,864,788 A | 1/1999 | Kutsumi |
| 5,873,056 A | 2/1999 | Liddy |
| 5,884,246 A | 3/1999 | Boucher et al. |
| 5,895,446 A | 4/1999 | Takeda et al. |
| 5,909,492 A | 6/1999 | Payne et al. |
| 5,917,484 A | 6/1999 | Mullaney |
| 5,950,194 A | 9/1999 | Bennett et al. |
| 5,956,711 A | 9/1999 | Sullivan et al. |
| 5,956,740 A | 9/1999 | Nosohara |
| 5,960,382 A | 9/1999 | Steiner |
| 5,966,685 A | 10/1999 | Flanagan et al. |
| 5,974,371 A | 10/1999 | Hirai et al. |
| 5,974,372 A | 10/1999 | Barnes |
| 5,974,413 A | 10/1999 | Beauregard et al. |
| 5,987,401 A | 11/1999 | Trudeau |
| 5,987,403 A | 11/1999 | Sugimura |
| 6,044,344 A | 3/2000 | Kanevsky |
| 6,044,363 A | 3/2000 | Mori et al. |
| 6,047,299 A | 4/2000 | Kaijima |
| 6,049,785 A | 4/2000 | Gifford |
| 6,070,138 A | 5/2000 | Iwata |
| 6,085,162 A | 7/2000 | Cherny |
| 6,092,034 A | 7/2000 | McCarley et al. |
| 6,092,035 A | 7/2000 | Kurachi et al. |
| 6,131,082 A | 10/2000 | Hargrave, III et al. |
| 6,139,201 A | 10/2000 | Carbonell et al. |
| 6,154,720 A | 11/2000 | Onishi et al. |
| 6,161,082 A | 12/2000 | Goldberg et al. |
| 6,163,785 A | 12/2000 | Carbonell et al. |
| 6,195,649 B1 | 2/2001 | Gifford |
| 6,199,051 B1 | 3/2001 | Gifford |
| 6,205,437 B1 | 3/2001 | Gifford |
| 6,212,634 B1 | 4/2001 | Geer et al. |
| 6,260,008 B1 | 7/2001 | Sanfilippo |
| 6,278,969 B1 | 8/2001 | King et al. |
| 6,279,112 B1 | 8/2001 | O'toole, Jr. et al. |
| 6,285,978 B1 | 9/2001 | Bernth et al. |
| 6,301,574 B1 | 10/2001 | Thomas et al. |
| 6,304,846 B1 | 10/2001 | George et al. |
| 6,338,033 B1 | 1/2002 | Bourbonnais et al. |
| 6,341,372 B1 | 1/2002 | Datig |
| 6,345,244 B1 | 2/2002 | Clark |
| 6,345,245 B1 | 2/2002 | Sugiyama et al. |
| 6,347,316 B1 | 2/2002 | Redpath |
| 6,353,824 B1 | 3/2002 | Boguraev et al. |
| 6,356,865 B1 | 3/2002 | Franz et al. |
| 6,385,568 B1 | 5/2002 | Brandon et al. |
| 6,393,389 B1 | 5/2002 | Chanod et al. |
| 6,401,105 B1 | 6/2002 | Carlin et al. |
| 6,415,257 B1 | 7/2002 | Junqua |
| 6,442,524 B1 | 8/2002 | Ecker et al. |
| 6,449,599 B1 | 9/2002 | Payne et al. |
| 6,470,306 B1 | 10/2002 | Pringle et al. |
| 6,473,729 B1 | 10/2002 | Gastaldo et al. |
| 6,477,524 B1 | 11/2002 | Taskiran |
| 6,490,358 B1 | 12/2002 | Geer et al. |
| 6,490,563 B2 | 12/2002 | Hon |
| 6,526,426 B1 | 2/2003 | Lakritz |
| 6,622,121 B1 | 9/2003 | Crepy et al. |
| 6,623,529 B1 | 9/2003 | Lakritz |
| 6,658,627 B1 | 12/2003 | Gallup et al. |
| 6,687,671 B2 | 2/2004 | Gudorf et al. |
| 6,731,625 B1 | 5/2004 | Eastep et al. |
| 6,782,384 B2 | 8/2004 | Sloan et al. |
| 6,865,528 B1 | 3/2005 | Huang |
| 6,920,419 B2 | 7/2005 | Kitamura |
| 6,952,691 B2 | 10/2005 | Drissi et al. |
| 6,976,207 B1 | 12/2005 | Rujan |
| 6,990,439 B2 | 1/2006 | Xun |
| 6,993,473 B2 | 1/2006 | Cartus |
| 7,013,264 B2 | 3/2006 | Dolan |
| 7,020,601 B1 | 3/2006 | Hummel et al. |
| 7,031,908 B1 | 4/2006 | Huang |
| 7,050,964 B2 | 5/2006 | Menzes |
| 7,089,493 B2 | 8/2006 | Hatori et al. |
| 7,100,117 B1 | 8/2006 | Chwa et al. |
| 7,110,938 B1 | 9/2006 | Cheng et al. |
| 7,124,092 B2 | 10/2006 | O'toole, Jr. et al. |
| 7,155,440 B1 | 12/2006 | Kronmiller et al. |
| 7,177,792 B2 | 2/2007 | Knight |
| 7,185,276 B2 | 2/2007 | Keswa |
| 7,191,447 B1 | 3/2007 | Ellis et al. |
| 7,194,403 B2 | 3/2007 | Okura et al. |
| 7,207,005 B2 | 4/2007 | Laktritz |
| 7,209,875 B2 | 4/2007 | Quirk et al. |
| 7,249,013 B2 | 7/2007 | Al-Onaizan |
| 7,266,767 B2 | 9/2007 | Parker |
| 7,272,639 B1 | 9/2007 | Levergood et al. |
| 7,295,962 B2 | 11/2007 | Marcu |
| 7,295,963 B2 | 11/2007 | Richardson |
| 7,333,927 B2 | 2/2008 | Lee |
| 7,340,388 B2 | 3/2008 | Soricut |
| 7,343,551 B1 | 3/2008 | Bourdev |
| 7,353,165 B2 | 4/2008 | Zhou et al. |
| 7,369,984 B2 | 5/2008 | Fairweather |
| 7,389,222 B1 | 6/2008 | Langmead |
| 7,389,223 B2 | 6/2008 | Atkin |
| 7,448,040 B2 | 11/2008 | Ellis et al. |
| 7,454,326 B2 | 11/2008 | Marcu |
| 7,509,313 B2 | 3/2009 | Colledge |
| 7,516,062 B2 | 4/2009 | Chen et al. |
| 7,533,013 B2 | 5/2009 | Marcu |
| 7,533,338 B2 | 5/2009 | Duncan et al. |

(56) References Cited

U.S. PATENT DOCUMENTS

| | | |
|---|---|---|
| 7,580,960 B2 | 8/2009 | Travieso et al. |
| 7,587,307 B2 | 9/2009 | Cancedda et al. |
| 7,594,176 B1 | 9/2009 | English |
| 7,596,606 B2 | 9/2009 | Codignotto |
| 7,620,538 B2 | 11/2009 | Marcu |
| 7,620,549 B2 | 11/2009 | Di Cristo |
| 7,624,005 B2 | 11/2009 | Koehn |
| 7,627,479 B2 | 12/2009 | Travieso et al. |
| 7,640,158 B2 | 12/2009 | Detlef et al. |
| 7,668,782 B1 | 2/2010 | Reistad et al. |
| 7,680,647 B2 | 3/2010 | Moore |
| 7,693,717 B2 | 4/2010 | Kahn et al. |
| 7,698,124 B2 | 4/2010 | Menezes et al. |
| 7,716,037 B2 | 5/2010 | Precoda |
| 7,734,459 B2 | 6/2010 | Menezes |
| 7,739,102 B2 | 6/2010 | Bender |
| 7,739,286 B2 | 6/2010 | Sethy |
| 7,788,087 B2 | 8/2010 | Corston-Oliver |
| 7,813,918 B2 | 10/2010 | Muslea |
| 7,865,358 B2 | 1/2011 | Green |
| 7,925,493 B2 | 4/2011 | Watanabe |
| 7,925,494 B2 | 4/2011 | Cheng et al. |
| 7,945,437 B2 | 5/2011 | Mount et al. |
| 7,983,896 B2 | 7/2011 | Ross et al. |
| 7,983,897 B2 | 7/2011 | Chin |
| 7,983,903 B2 | 7/2011 | Gao |
| 8,050,906 B1 | 11/2011 | Zimmerman et al. |
| 8,078,450 B2 | 12/2011 | Anisimovich et al. |
| 8,135,575 B1 | 3/2012 | Dean |
| 8,195,447 B2 | 6/2012 | Anismovich |
| 8,214,196 B2 | 7/2012 | Yamada |
| 8,239,186 B2 | 8/2012 | Chin |
| 8,239,207 B2 | 8/2012 | Seligman |
| 8,244,519 B2 * | 8/2012 | Bicici ............... G06F 17/2836 704/2 |
| 8,249,855 B2 | 8/2012 | Zhou et al. |
| 8,275,604 B2 | 9/2012 | Jiang et al. |
| 8,286,185 B2 | 10/2012 | Ellis et al. |
| 8,296,127 B2 | 10/2012 | Marcu |
| 8,352,244 B2 | 1/2013 | Gao et al. |
| 8,364,463 B2 | 1/2013 | Miyamoto |
| 8,386,234 B2 | 2/2013 | Uchimoto et al. |
| 8,423,346 B2 | 4/2013 | Seo et al. |
| 8,442,812 B2 | 5/2013 | Ehsani |
| 8,521,506 B2 | 8/2013 | Lancaster et al. |
| 8,527,260 B2 | 9/2013 | Best |
| 8,548,794 B2 | 10/2013 | Koehn |
| 8,554,591 B2 | 10/2013 | Reistad et al. |
| 8,594,992 B2 | 11/2013 | Kuhn et al. |
| 8,600,728 B2 | 12/2013 | Knight |
| 8,606,900 B1 | 12/2013 | Levergood et al. |
| 8,612,203 B2 | 12/2013 | Foster |
| 8,615,388 B2 | 12/2013 | Li |
| 8,620,793 B2 | 12/2013 | Knyphausen et al. |
| 8,635,327 B1 | 1/2014 | Levergood et al. |
| 8,635,539 B2 | 1/2014 | Young |
| 8,666,725 B2 | 3/2014 | Och |
| 8,688,454 B2 | 4/2014 | Zheng |
| 8,725,496 B2 | 5/2014 | Zhao |
| 8,768,686 B2 | 7/2014 | Sarikaya et al. |
| 8,775,154 B2 | 7/2014 | Clinchant |
| 8,818,790 B2 | 8/2014 | He et al. |
| 8,843,359 B2 | 9/2014 | Lauder |
| 8,862,456 B2 | 10/2014 | Krack et al. |
| 8,874,427 B2 | 10/2014 | Ross et al. |
| 8,898,052 B2 | 11/2014 | Waibel |
| 8,903,707 B2 | 12/2014 | Zhao |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,972,268 B2 | 3/2015 | Waibel |
| 9,026,425 B2 | 5/2015 | Nikoulina |
| 9,053,202 B2 | 6/2015 | Viswanadha |
| 9,081,762 B2 | 7/2015 | Wu |
| 9,128,929 B2 | 9/2015 | Albat |
| 9,141,606 B2 | 9/2015 | Marciano |
| 9,176,952 B2 | 11/2015 | Aikawa |
| 9,183,192 B1 | 11/2015 | Ruby, Jr. |
| 9,183,198 B2 | 11/2015 | Shen et al. |
| 9,201,870 B2 | 12/2015 | Jurach |
| 9,208,144 B1 | 12/2015 | Abdulnasyrov |
| 9,262,403 B2 | 2/2016 | Christ |
| 9,342,506 B2 | 5/2016 | Ross et al. |
| 9,396,184 B2 | 7/2016 | Roy |
| 9,400,786 B2 | 7/2016 | Lancaster et al. |
| 9,465,797 B2 | 10/2016 | Ji |
| 9,471,563 B2 | 10/2016 | Trese |
| 9,519,640 B2 | 12/2016 | Perez |
| 9,552,355 B2 | 1/2017 | Dymetman |
| 9,600,472 B2 | 3/2017 | Cheng et al. |
| 9,600,473 B2 | 3/2017 | Leydon |
| 9,613,026 B2 | 4/2017 | Hodson |
| 10,198,438 B2 | 2/2019 | Cheng et al. |
| 10,216,731 B2 | 2/2019 | Cheng et al. |
| 10,248,650 B2 | 4/2019 | Ross et al. |
| 2002/0002461 A1 | 1/2002 | Tetsumoto |
| 2002/0046018 A1 | 4/2002 | Marcu |
| 2002/0083103 A1 | 6/2002 | Ballance |
| 2002/0093416 A1 | 7/2002 | Goers et al. |
| 2002/0099547 A1 | 7/2002 | Chu et al. |
| 2002/0103632 A1 | 8/2002 | Dutta et al. |
| 2002/0107684 A1 | 8/2002 | Gao |
| 2002/0110248 A1 | 8/2002 | Kovales et al. |
| 2002/0111787 A1 | 8/2002 | Knyphausen et al. |
| 2002/0124109 A1 | 9/2002 | Brown |
| 2002/0138250 A1 | 9/2002 | Okura et al. |
| 2002/0165708 A1 | 11/2002 | Kumhyr |
| 2002/0169592 A1 | 11/2002 | Aityan |
| 2002/0188439 A1 | 12/2002 | Marcu |
| 2002/0198701 A1 | 12/2002 | Moore |
| 2003/0004702 A1 | 1/2003 | Higinbotham |
| 2003/0009320 A1 | 1/2003 | Furuta |
| 2003/0016147 A1 | 1/2003 | Evans |
| 2003/0040900 A1 | 2/2003 | D'Agostini |
| 2003/0069879 A1 | 4/2003 | Sloan et al. |
| 2003/0078766 A1 | 4/2003 | Appelt et al. |
| 2003/0105621 A1 | 6/2003 | Mercier |
| 2003/0120479 A1 | 6/2003 | Parkinson et al. |
| 2003/0158723 A1 | 8/2003 | Masuichi et al. |
| 2003/0182279 A1 | 9/2003 | Willows |
| 2003/0194080 A1 | 10/2003 | Michaelis et al. |
| 2003/0200094 A1 | 10/2003 | Gupta |
| 2003/0229622 A1 | 12/2003 | Middelfart |
| 2003/0233222 A1 | 12/2003 | Soricut et al. |
| 2004/0024581 A1 | 2/2004 | Koehn et al. |
| 2004/0034520 A1 | 2/2004 | Langkilde-Geary |
| 2004/0044517 A1 | 3/2004 | Palmquist |
| 2004/0122656 A1 | 6/2004 | Abir |
| 2004/0172235 A1 | 9/2004 | Pinkham et al. |
| 2004/0255281 A1 | 12/2004 | Imamura et al. |
| 2005/0021323 A1 | 1/2005 | Li |
| 2005/0055212 A1 | 3/2005 | Nagao |
| 2005/0075858 A1 | 4/2005 | Pournasseh et al. |
| 2005/0076342 A1 | 4/2005 | Levins et al. |
| 2005/0094475 A1 | 5/2005 | Naoi |
| 2005/0149316 A1 | 7/2005 | Ushioda et al. |
| 2005/0171758 A1 | 8/2005 | Palmquist |
| 2005/0171944 A1 | 8/2005 | Palmquist |
| 2005/0197827 A1 | 9/2005 | Ross et al. |
| 2005/0222837 A1 | 10/2005 | Deane |
| 2005/0222973 A1 | 10/2005 | Kaiser |
| 2005/0273314 A1 | 12/2005 | Chang et al. |
| 2006/0015320 A1 | 1/2006 | Och |
| 2006/0095526 A1 | 5/2006 | Levergood et al. |
| 2006/0095848 A1 | 5/2006 | Naik |
| 2006/0136277 A1 | 6/2006 | Perry |
| 2006/0256139 A1 | 11/2006 | Gikandi |
| 2006/0282255 A1 | 12/2006 | Lu |
| 2006/0287844 A1 | 12/2006 | Rich |
| 2007/0043553 A1 | 2/2007 | Dolan |
| 2007/0112553 A1 | 5/2007 | Jacobson |
| 2007/0118378 A1 | 5/2007 | Skuratovsky |

(56) References Cited

U.S. PATENT DOCUMENTS

| | | |
|---|---|---|
| 2007/0136470 A1 | 6/2007 | Chikkareddy et al. |
| 2007/0150257 A1 | 6/2007 | Cancedda et al. |
| 2007/0192110 A1 | 8/2007 | Mizutani et al. |
| 2007/0230729 A1 | 10/2007 | Naylor et al. |
| 2007/0233460 A1 | 10/2007 | Lancaster et al. |
| 2007/0233463 A1 | 10/2007 | Sparre |
| 2007/0244702 A1 | 10/2007 | Kahn et al. |
| 2007/0294076 A1 | 12/2007 | Shore et al. |
| 2008/0077395 A1* | 3/2008 | Lancaster ........... G06F 17/2827 704/9 |
| 2008/0086298 A1 | 4/2008 | Anismovich |
| 2008/0109374 A1 | 5/2008 | Levergood et al. |
| 2008/0141180 A1 | 6/2008 | Reed et al. |
| 2008/0147378 A1 | 6/2008 | Hall |
| 2008/0154577 A1 | 6/2008 | Kim |
| 2008/0201344 A1 | 8/2008 | Levergood et al. |
| 2008/0243834 A1 | 10/2008 | Rieman et al. |
| 2008/0288240 A1 | 11/2008 | D'Agostini et al. |
| 2008/0294982 A1 | 11/2008 | Leung et al. |
| 2009/0094017 A1 | 4/2009 | Chen et al. |
| 2009/0132230 A1 | 5/2009 | Kanevsky et al. |
| 2009/0187577 A1 | 7/2009 | Reznik et al. |
| 2009/0204385 A1 | 8/2009 | Cheng et al. |
| 2009/0217196 A1 | 8/2009 | Neff et al. |
| 2009/0240539 A1 | 9/2009 | Slawson |
| 2009/0248182 A1 | 10/2009 | Logan et al. |
| 2009/0248482 A1 | 10/2009 | Knyphausen et al. |
| 2009/0313005 A1 | 12/2009 | Jaquinta |
| 2009/0326917 A1 | 12/2009 | Hegenberger |
| 2010/0057439 A1 | 3/2010 | Ideuchi et al. |
| 2010/0057561 A1 | 3/2010 | Gifford |
| 2010/0121630 A1 | 5/2010 | Mende et al. |
| 2010/0138213 A1* | 6/2010 | Bicici ................ G06F 17/2818 704/4 |
| 2010/0179803 A1 | 7/2010 | Sawaf |
| 2010/0223047 A1 | 9/2010 | Christ |
| 2010/0241482 A1 | 9/2010 | Knyphausen et al. |
| 2010/0262621 A1 | 10/2010 | Ross et al. |
| 2011/0066469 A1 | 3/2011 | Kadosh |
| 2011/0097693 A1 | 4/2011 | Crawford |
| 2011/0184719 A1 | 7/2011 | Christ |
| 2012/0022852 A1 | 1/2012 | Tregaskis |
| 2012/0046934 A1 | 2/2012 | Cheng et al. |
| 2012/0095747 A1 | 4/2012 | Ross et al. |
| 2012/0185235 A1 | 7/2012 | Albat |
| 2012/0330990 A1 | 12/2012 | Chen et al. |
| 2013/0173247 A1 | 7/2013 | Hodson |
| 2013/0325442 A1 | 12/2013 | Dahlmeier |
| 2013/0346062 A1* | 12/2013 | Lancaster ........... G06F 17/2827 704/2 |
| 2014/0006006 A1 | 1/2014 | Christ |
| 2014/0012565 A1* | 1/2014 | Lancaster ........... G06F 17/2827 704/7 |
| 2014/0058718 A1 | 2/2014 | Kunchukuttan |
| 2014/0142917 A1 | 5/2014 | D'Penha |
| 2014/0142918 A1 | 5/2014 | Dotterer |
| 2014/0229257 A1 | 8/2014 | Reistad et al. |
| 2014/0297252 A1 | 10/2014 | Prasad et al. |
| 2014/0358519 A1 | 12/2014 | Mirkin |
| 2014/0358524 A1 | 12/2014 | Papula |
| 2014/0365201 A1 | 12/2014 | Gao |
| 2015/0051896 A1 | 2/2015 | Simard |
| 2015/0142415 A1 | 5/2015 | Cheng et al. |
| 2015/0169554 A1 | 6/2015 | Ross et al. |
| 2015/0186362 A1 | 7/2015 | Li |
| 2016/0162473 A1 | 6/2016 | Cogley et al. |
| 2016/0162478 A1 | 6/2016 | Blassin et al. |
| 2016/0170974 A1* | 6/2016 | Martinez Corria ... G06F 17/289 704/4 |
| 2016/0253319 A1 | 9/2016 | Ross et al. |
| 2017/0046333 A1 | 2/2017 | Mirkin et al. |
| 2017/0068664 A1* | 3/2017 | Martinez Corria ... G06F 17/289 |
| 2017/0132214 A1 | 5/2017 | Cheng et al. |
| 2017/0169015 A1 | 6/2017 | Huang |
| 2018/0137108 A1* | 5/2018 | Martinez Corria ........................ G06F 17/2854 |
| 2018/0300218 A1* | 10/2018 | Lipka ................ G06F 11/362 |
| 2018/0300318 A1* | 10/2018 | Sittel ................ G06F 17/2854 |
| 2018/0307683 A1* | 10/2018 | Lipka ................ G06F 16/986 |
| 2019/0171717 A1 | 6/2019 | Cheng et al. |
| 2019/0179116 A1 | 6/2019 | Huang et al. |
| 2019/0197116 A1 | 6/2019 | Vlad et al. |

FOREIGN PATENT DOCUMENTS

| | | |
|---|---|---|
| AU | 5202299 A | 10/1999 |
| AU | 199938259 A | 11/1999 |
| AU | 761311 B2 | 9/2003 |
| CA | 2221506 A1 | 12/1996 |
| CA | 231184 C | 7/2009 |
| CN | 1179289 C | 12/2004 |
| CN | 1770144 A | 5/2006 |
| CN | 101019113 A | 8/2007 |
| CN | 101826072 A | 9/2010 |
| CN | 101248415 B | 10/2010 |
| CN | 102053958 A | 5/2011 |
| CN | 102193914 A | 9/2011 |
| CN | 102662935 A | 9/2012 |
| CN | 102902667 A | 1/2013 |
| DE | 69525374 T2 | 8/2002 |
| DE | 69431306 T2 | 5/2003 |
| DE | 69633564 T2 | 11/2005 |
| EP | 0262938 A1 | 4/1988 |
| EP | 0668558 A1 | 8/1995 |
| EP | 0830774 B1 | 2/1998 |
| EP | 0830774 A2 | 3/1998 |
| EP | 0887748 A2 | 12/1998 |
| EP | 1076861 A1 | 2/2001 |
| EP | 1128301 A2 | 8/2001 |
| EP | 1128302 A2 | 8/2001 |
| EP | 1128303 A2 | 8/2001 |
| EP | 0803103 A1 | 2/2002 |
| EP | 1235177 A2 | 8/2002 |
| EP | 0734556 B1 | 9/2002 |
| EP | 1266313 A2 | 12/2002 |
| EP | 1489523 A2 | 12/2004 |
| EP | 1076861 B1 | 6/2005 |
| EP | 1787221 A2 | 5/2007 |
| EP | 1889149 A2 | 2/2008 |
| EP | 2226733 A1 | 9/2010 |
| EP | 2299369 A1 | 3/2011 |
| EP | 2317447 A1 | 5/2011 |
| EP | 2336899 A2 | 6/2011 |
| EP | 2317447 B1 | 1/2014 |
| GB | 2241359 A | 8/1991 |
| GB | 2433403 A | 6/2007 |
| GB | 2468278 A | 9/2010 |
| GB | 2474839 A | 5/2011 |
| JP | H04152466 A | 5/1992 |
| JP | H05135095 A | 6/1993 |
| JP | H05197746 A | 8/1993 |
| JP | H06035962 A | 2/1994 |
| JP | H06259487 A | 9/1994 |
| JP | H07093331 A | 4/1995 |
| JP | H08055123 A | 2/1996 |
| JP | H09114907 A | 5/1997 |
| JP | H10063747 A | 3/1998 |
| JP | H10097530 A | 4/1998 |
| JP | H10509543 A | 9/1998 |
| JP | H11507752 A | 7/1999 |
| JP | 3190881 B2 | 7/2001 |
| JP | 3190882 B2 | 7/2001 |
| JP | 3260693 B2 | 2/2002 |
| JP | 2002513970 A | 5/2002 |
| JP | 3367675 B2 | 1/2003 |
| JP | 2003150623 A | 5/2003 |
| JP | 2003157402 A | 5/2003 |
| JP | 2004318510 A | 11/2004 |
| JP | 2005107597 A | 4/2005 |
| JP | 3762882 B2 | 4/2006 |
| JP | 2006216073 A | 8/2006 |
| JP | 2007042127 A | 2/2007 |
| JP | 2007249606 A | 9/2007 |

(56) References Cited

FOREIGN PATENT DOCUMENTS

| | | |
|---|---|---|
| JP | 2008152670 A | 7/2008 |
| JP | 2008152760 A | 7/2008 |
| JP | 4485548 B2 | 6/2010 |
| JP | 4669373 B2 | 4/2011 |
| JP | 4669430 B2 | 4/2011 |
| JP | 2011095841 A | 5/2011 |
| JP | 4718687 B2 | 7/2011 |
| JP | 5473533 B2 | 4/2014 |
| WO | WO199406086 A1 | 3/1994 |
| WO | WO9516971 A1 | 6/1995 |
| WO | WO9613013 A1 | 5/1996 |
| WO | WO9642041 A2 | 12/1996 |
| WO | WO9715885 A1 | 5/1997 |
| WO | WO9804061 A1 | 1/1998 |
| WO | WO9819224 A2 | 5/1998 |
| WO | WO9952626 A1 | 10/1999 |
| WO | WO199957651 A1 | 11/1999 |
| WO | WO2000057320 A2 | 9/2000 |
| WO | WO200101289 A1 | 1/2001 |
| WO | WO200129696 A1 | 4/2001 |
| WO | WO2002029622 A1 | 4/2002 |
| WO | WO2002039318 A1 | 5/2002 |
| WO | WO2006016171 A2 | 2/2006 |
| WO | WO2006121849 A2 | 11/2006 |
| WO | WO2007068123 A1 | 6/2007 |
| WO | WO2008055360 A1 | 5/2008 |
| WO | WO2008083503 A1 | 7/2008 |
| WO | WO2008147647 A1 | 12/2008 |
| WO | WO2010062540 A1 | 6/2010 |
| WO | WO2010062542 A1 | 6/2010 |
| WO | WO2019133506 A1 | 7/2019 |

OTHER PUBLICATIONS

Second Examination Report dated Feb. 19, 2013 for European Patent Application 06759147.9, filed May 8, 2006, 5 pages.
Langlais, et al. "TransType: a Computer-Aided Translation Typing System", in Conference on Language Resources and Evaluation, 2000, pp. 46-51.
First Notice of Reasons for Rejection dated Jun. 18, 2013 for Japanese Patent Application 2009-246729, filed Oct. 27, 2019, 3 pages.
First Notice of Reasons for Rejection dated Jun. 4, 2013 for Japanese Patent Application 2010-045531, filed Oct. 27, 2009, 4 pages.
Rejection Decision dated May 14, 2013 for Chinese Patent Application 200910253192.6, filed Dec. 14, 2009, 9 pages.
Matsunaga, et al. "Sentence Matching Algorithm of Revised Documents with Considering Context Information," IEICE Technical Report, 2003, pp. 43-48.
Pennington, Paula K. Improving Quality in Translation Through an Awareness of Process and Self-Editing Skills. Eastern Michigan University, ProQuest, UMI Dissertations Publishing, 1994, 115 pages.
Notice of Allowance dated Jan. 7, 2014 for Japanese Patent Application 2009-246729, filed Oct. 27, 2009, 3 pages.
Kumano et al., "Japanese-English Translation Selection Using Vector Space Model," Journal of Natural Language Processing; vol. 10; No. 3; (2003); pp. 39-59.
Final Rejection and a Decision to Dismiss the Amendment dated Jan. 7, 2014 for Japanese Patent Application 2010-045531, filed Mar. 2, 2010, 4 pages.
Office Action dated Feb. 24, 2014 for Chinese Patent Application No. 201010521841.9, filed Oct. 25, 2010, 30 pages.
Extended European Search Report dated Oct. 24, 2014 for European Patent Application 10185842.1, filed Oct. 1, 2010, 8 pages.
Summons to attend oral proceeding pursuant to Rule 115(1)(EPC) dated Oct. 13, 2014 in European Patent Application 00902634.5 filed Jan. 26, 2000, 8 pages.
Summons to attend oral proceeding pursuant to Rule 115(1)(EPC) dated Feb. 3, 2015 in European Patent Application 06759147.9 filed May 8, 2006, 5 pages.

Decision to Refuse dated Mar. 2, 2015 in European Patent Application 00902634.5 filed Jan. 26, 2000, 15 pages.
Brief Communication dated Jun. 17, 2015 in European Patent Application 06759147.9 filed May 8, 2006, 20 pages.
Somers, H. "EBMT Seen as Case-based Reasoning" Mt Summit VIII Workshop on Example-Based Machine Translation, 2001, pp. 56-65, XP055196025.
The Minutes of Oral Proceedings mailed Mar. 2, 2015 in European Patent Application 00902634.5 filed Jan. 26, 2000, 19 pages.
Notification of Reexamination dated Aug. 18, 2015 in Chinese Patent Application 200910253192.6, filed Dec. 14, 2009, 24 pages.
Decision to Refuse dated Aug. 24, 2015 in European Patent Application 06759147.9, filed May 8, 2006, 26 pages.
Papineni, Kishore, et al., "BLEU: A Method for Automatic Evaluation of Machine Translation," Proceedings of the 40th Annual Meeting on Association for Computational Linguistics. Association for Computational Linguistics, 2002, pp. 311-318.
"Office Action," European Patent Application No. 10185842.1, dated Dec. 8, 2016, 7 pages.
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.
Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.
Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.
Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.
Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.
Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.
Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.
Hardmeier et al. "Tree Kernels for Machine Translation Quality Estimation" [W12- 3112] Proceedings of the Seventh Workshop on Statistical Machine Translation,Jun. 7, 2012, pp. 109-113. Retrieved from: http://aclanthology.info/volumes/proceedings-of-the-seventh-workshop-onstatistical-machine-translation.
Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.

(56) References Cited

OTHER PUBLICATIONS

Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.
Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.
Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.
Rubino et al. "DCU—Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.
Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthologyinfo/volumes/proceedings-of-the-seventh-workshop-onstatistical-machine-translation.
Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthologyinfo/volumes/proceedings-of-the-seventh-workshop-onstatistical-machine-translation.
Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.
"Best Practices—Knowledge Base," Lilt website [online], Mar. 6, 2017 [retrieved on Oct. 19, 2017], Retrieved from the Internet:<https://lilt.com/kb/translators/best-practices>, 2 pages.
"Data Security—Knowledge Base," Lilt website [online], Oct. 14, 2016 [retrieved on Oct. 19, 2017], Retrieved from the Internet:<https://lilt.com/kb/security>, 1 pages.
"Data Security and Confidentiality," Lilt website [online], 2017 [retrieved on Oct. 19, 2017], Retrieved from the Internet:<https://lilt.com/security>, 7 pages.
"Memories—Knowledge Base," Lilt website [online], Jun. 7, 2017 [retrieved on Oct. 19, 2017], Retrieved from the Internet:<https://lilt.com/kb/project-managers/memory>, 4 pages.
"Memories (API)—Knowledge Base," Lilt website [online], Jun. 2, 2017 [retrieved on Oct. 19, 2017], Retrieved from the Internet:<https://lilt.com/kb/api/memories>, 1 page.
"Quoting—Knowledge Base," Lilt website [online], Jun. 7, 2017 [retrieved on Oct. 19, 2017], Retrieved from the Internet:<https://lilt.com/kb/project-managers/quoting>, 4 pages.
"The Editor—Knowledge Base," Lilt website [online], Aug. 15, 2017 [retrieved on Oct. 19, 2017], Retrieved from the Internet:<https://lilt.com/kb/translators/editor>, 5 pages.
"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.
"What is Lilt_—Knowledge Base," Lilt website [online],Dec. 15, 2016 [retrieved on Oct. 19, 2017], Retrieved from the Internet:<https://lilt.com/kb/what-is-lilt>, 1 page.
"Getting Started—Knowledge Base," Lilt website [online], Apr. 11, 2017 [retrieved on Oct. 20, 2017], Retrieved from the Internet:<https://lilt.com/kb/translators/getting-started>, 2 pages.

Komatsu, H et al, "Corpus-based predictive text input", "Proceedings of the 2005 International Conference on Active Media Technology", 2005, IEEE, pp. 75 80, ISBN 0-7803-9035-0.
Saiz, Jorge Civera: "Novel statistical approaches to text classification, machine translation and computer-assisted translation" Doctor En Informatica Thesis, May 22, 2008, XP002575820 Universidad Polit'ecnica de Valencia, Spain. Retrieved from Internet: http://dspace.upv.es/manakin/handle/10251/2502 [retrieved on Mar. 30, 2010]. p. 111 131.
De Gispert, A., Marino, J.B. and Crego, J.M.: "Phrase-Based Alignment Combining Corpus Cooccurrences and Linguistic Knowledge" Proc. of the Int. Workshop on Spoken Language Translation (IWSLT'04), Oct. 1, 2004, XP002575821 Kyoto, Japan. pp. 107-114. Retrieved from the Internet: http://mi.eng.cam.ac.uk/~ad465/agispert/docs/papers/TP_gispert.pdf [retrieved on Mar. 30, 2010].
Planas, Emmanuel: "SIMILIS Second-generation translation memory software," Translating and the Computer 27, Nov. 2005 [London: Aslib, 2005], 7 pages.
Net Auction, www.netauction.net/dragonart.html, "Come bid on original illustrations," by Greg & Tim Hildebrandt, Feb. 3, 2001. (last accessed Nov. 16, 2011), 3 pages.
Web Pages—Bid Net, www.bidnet.com, "Your link to the State and Local Government Market," including Bid Alert Service, Feb. 7, 2009. (last accessed Nov. 16, 2011), 1 page.
Web Pages Christie's, www.christies.com, including "How to Buy," and "How to Sell," Apr. 23, 2009. (last accessed Nov. 16, 2011), 1 page.
Web Pages Artrock Auction, www.commerce.com, Auction Gallery, Apr. 7, 2007. (last accessed Nov. 16, 2011), 1 page.
Trados Translator's Workbench for Windows, 1994-995, Trados GmbH, Stuttgart, Germany, pp. 9-13 and 27-96.
Notification of Reasons for Resusal for Japanese Application No. 2000-607125 dared Nov. 10, 2009 (Abstract Only), 3 pages.
Ross et al., U.S. Appl. No. 11/071,706, filed Mar. 3, 2005, Office Communication dated Dec. 13, 2007, 19 pages.
Ross et al., U.S. Appl. No. 11/071,706, filed Mar. 3, 2005, Office Communication dated Oct. 6, 2008, 36 pages.
Ross et al., U.S. Appl. No. 11/071,706, filed Mar. 3, 2005, Office Communication dated Jun. 9, 2009, 37 pages.
Ross et al., U.S. Appl. No. 11/071,706, filed Mar. 3, 2005, Office Communication dated Feb. 18, 2010, 37 pages.
Colucci, Office Communication for U.S. Appl. No. 11/071,706 dated Sep. 24, 2010, 18 pages.
Och, et al., "Improved Alignment Models for Statistical Machine Translation," In: Proceedings of the Joint Workshop on Empirical Methods in NLP and Very Large Corporations, 1999, p. 20-28, downloaded from http://www.actweb.org/anthology-new/W/W99/W99-0604.pdf.
International Search Report and Written Opinion dated Sep. 4, 2007 in Patent Cooperation Treaty Application No. PCT/US06/17398, 9 pages.
XP 002112717 Machine translation software for the Internet, Harada K.; et al, vol. 28, Nr:2, pp. 66-74. Sanyo Technical Review San'yo Denki Giho, Hirakata, JP ISSN 0285-516X, Oct. 1, 1996.
XP 000033460 Method to Make a Translated Text File Have the Same Printer Control Tags as the Original Text File, vol. 32, Nr:2, pp. 375-377, IBM Technical Disclosure Bulletin, International Business Machines Corp. (Thornwood), US ISSN 0018-8689, Jul. 1, 1989.
XP 002565038—Integrating Machine Translation into Translation Memory Systems, Matthias Heyn, pp. 113-126, TKE. Terminology and Knowledge Engineering. Proceedings International Congress on Terminology and Knowledge Engineering, Aug. 29-30, 1996.
XP 002565039—Linking translation memories with example-based machine translation, Michael Carl; Silvia Hansen, pp. 617-624, Machine Translation Summit. Proceedings, Sep. 1, 1999.
XP 55024828 TransType2 An Innovative Computer-Assisted Translation System, ACL 2004, Jul. 21, 2004, Retrieved from the Internet: http://www.mt-archive.info/ACL-2004-Esteban.pdf [retrieved on Apr. 18, 2012], 4 pages.
Bourigault, Surface Grammatical Analysis for the Extraction of Terminological Noun Phrases, Proc. of Coling—92, Aug. 23, 1992, pp. 977-981, Nantes, France.

(56) References Cited

OTHER PUBLICATIONS

Thurmair, Making Term Extraction Tools Usable, The Joint Conference of the 8th International Workshop of the European Association for Machine Translation, May 15, 2003, Dublin, Ireland, 10 pages.
Sanfillipo, Section 5.2 Multiword Recognition and Extraction, Eagles LE3-4244, Preliminary Recommendations on Lexical Semantic Encoding, Jan. 7, 1999, pp. 176-186.
Hindle et al., Structural Ambiguity and lexical Relations, 1993, Association for Computational Linguistics, vol. 19, No. 1, pp. 103-120.
Ratnaparkhi, A Maximum Entropy Model for Part-Of-Speech Tagging, 1996, Proceedings for the conference on empirical methods in natural language processing, V.1, pp. 133-142.
Somers, H. "Review Article: Example-based Machine Translation," Machine Translation, Issue 14, pp. 113-157, 1999.
Civera, et al. "Computer-Assisted Translation Tool Based on Finite-State Technology," In: Proc. of EAMT, 2006, pp. 33-40 (2006).
Okura, Seiji et al., "Translation Assistance by Autocomplete," The Association for Natural Language Processing, Publication 13th Annual Meeting Proceedings, Mar. 2007, p. 678-679.
Soricut, R, et al., "Using a Large Monolingual Corpus to Improve Translation Accuracy," Proc. of the Conference of the Association for Machine Translation in the Americas (AMTA-2002), Aug. 10, 2002, pp. 155-164, XP002275656.
Fung et al. "An IR Approach for Translating New Words from Nonparallel, Comparable Texts," Proceeding COLING '998 Proceedings of the 17th International Conference on Computational Linguistics, 1998, pp. 414-420.
Office Action dated Dec. 26, 2008 in Chinese Patent Application 200580027102.1, filed Aug. 11, 2005, 7 pages.
Second Office Action dated Aug. 28, 2009 in Chinese Patent Application 200580027102.1, filed Aug. 11, 2005, 8 pages.
Third Office Action dated Apr. 28, 2010 in Chinese Patent Application 200580027102.1, filed Aug. 11, 2005, 8 pages.
Summons to attend oral proceeding pursuant to Rule 115(1)(EPC) dated Mar. 20, 2012 in European Patent Application 05772051.8 filed Aug. 11, 2005, 7 pages.
Notification of Reasons for Rejection dated Jan. 9, 2007 for Japanese Patent Application 2000-547557, filed Apr. 30, 1999, 2 pages.
Decision of Rejection dated Jul. 3, 2007 for Japanese Patent Application 2000-547557, filed Apr. 30, 1999, 2 pages.
Extended European Search Report and Written Opinion dated Jan. 26, 2011 for European Patent Application 10189145.5, filed on Oct. 27, 2010, 9 pages.
Notice of Reasons for Rejection dated Jun. 26, 2012 for Japanese Patent Application P2009-246729. filed Oct. 27, 2009, 8 pages.
Search Report dated Jan. 22, 2010 for United Kingdom Application GB0918765.9, filed Oct. 27, 2009, 5 pages.
Notice of Reasons for Rejection dated Mar. 30, 2010 for Japanese Patent Application 2007-282902. filed Apr. 30, 1999, 5 pages.
Decision of Rejection dated Mar. 15, 2011 for Japanese Patent Application 2007-282902, filed Apr. 30, 1999, 5 pages.
First Office Action dated Oct. 18, 2011 for Chinese Patent Application 2009102531926, filed Dec. 14, 2009, 7 pages.
Second Office Action dated Aug. 14, 2012 for Chinese Patent Application 2009102531926, filed Dec. 14, 2009, 6 pages.
European Search Report dated Apr. 12, 2010 for European Patent Application 09179150.9, filed Dec. 14, 2009, 6 pages.
First Examination Report dated Jun. 16, 2011 for European Patent Application 09179150.9, filed Dec. 14, 2009, 6 pages.
Notice of Reasons for Rejection dated Jul. 31, 2012 for Japanese Patent Application 2010-045531, filed Mar. 2, 2010, 10 pages.
First Examination Report dated Oct. 26, 2012 for United Kingdom Patent Application GB0903418.2, filed Mar. 2, 2009, 6 pages.
First Office Action dated Jun. 19, 2009 for Chinese Patent Application 200680015388.6, filed May 8, 2006, 15 pages.
"The Lexicon—Knowledge Base," Lilt website [online], Jun. 7, 2017 [retrieved on Oct. 20, 2017], Retrieved from the Internet: <https://lilt.com/kb/translators/lexicon>, 4 pages.

"Simple Translator—Knowledge Base," Lilt website [oniine], Aug. 17, 2017 [retrieved on Oct. 20, 2017], Retrieved from the Internet:<https://lilt.com/kb/api/simple-translation>, 3 pages.
"Split and Merge—Knowledge Base," Lilt website [oniine], Oct. 14, 2016 [retrieved on Oct. 20, 2017], Retrieved from the Internet:<https://lilt.com/kb/translators/split-merge>, 4 pages.
"Lilt API_API Reference," Lilt website [online], retrieved on Oct. 20, 2017, Retrieved from the Internet:<https://lilt.com/docs/api>, 53 pages.
"Automatic Translator Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.
"Projects—Knowledge Base," Lilt website [oniine], Jun. 7, 2017 [retrieved on Oct. 20, 2017], Retrieved from the Internet:<https://lilt.com/kb/project-managers/projects>, 3 pages.
"Getting Started with lilt," Lilt website [oniine], May 30, 2017 [retrieved on Oct. 20, 2017], Retrieved from the Internet:<https://lilt.com/kb/api/lilt-js>, 6 pages.
"Interactive Translation—Knowledge Base," Lilt website [oniine], Aug. 17, 2017 [retrieved on Oct. 20, 2017], Retrieved from the Internet:<https://lilt.com/kb/api/interactive-translation>, 2 pages.
Hildebrand et al., "Adaptation of the Translation Model for Statistical Machine Translation based on Information Retrieval," EAMT 2005 Conference Proceedings, May 2005, pp. 133-142. Retrieved from https://www.researchgate.net/publication/228634956_Adaptation_of_the_translation_model_for_statistical_machine_translation_based_on_information retrieval.
Och et al., "The Alignment Template Approach to Statistical Machine Translation Machine Translation," Computational Linguistics, vol. 30, No. 4, Dec. 1, 2004, pp. 417-442 (39 pages with citations). Retrieval from http://dl.acm.org/citation-cfm?id=1105589.
Sethy et al., "Building Topic Specific Language Models FromWebdata Using Competitive Models," INTERSPEECH 2005—Eurospeech, 9th European Conference on Speech Communication and Technology, Lisbon, Portugal, Sep. 4-8, 2005, 4 pages. Retrieval from https://www.researchgate.net/publication/221490916_Building_topic_specific_language_models_from_webdata_using_competitive_models.
Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.
Business Wire, "Language Weaver Introduces User-Managed Customization Tool," Oct. 25, 2005, 3 pages. Retrieved from http: ProQuest.
Winiwarter, W., "Learning Transfer Rules for Machine Translation from Parallel Corpora," Journal of Digital Information Management, vol. 6 No. 4, Aug. 2008, pp. 285-293. Retrieved from https://www.researchgate.net/publication/220608987_Learning_Transfer_Rules_for_Machine_Translation_from_Parallel_Corpora.
Potet et al., "Preliminary Experiments on Using Users' Post-Editions to Enhance a SMT System," Proceedings of the European Association for Machine Translation (EAMT), May 2011, pp. 161-168. Retreived from Retrieved at http://www.mt-archive.info/EAMT-2011-Potet.pdf.
Ortiz-Martinez et al., "An Interactive Machine Translation System with Online Learning" Proceedings of the ACL-HLT 2011 System Demonstrations, Jun. 21, 2011, pp. 68-73. Retrieved from http://www.aclweb.org/anthology/P11-4012.
Lopez-Salcedo et al.,"Online Learning of Log-Linear Weights in Interactive Machine Translation," Communications in Computer and Information Science, vol. 328, 2011, pp. 1-10. Retrieved from http://www.casmacat.eu/uploads/Main/iberspeech2.pdf.
Blanchon et al., "A Web Service Enabling Gradable Post-edition of Pre-translations Pro duced by Existing Translation Tools: Practical Use to Provide High quality Translation of an Online Encyclopedia" Jan. 2009, 9 pages. Retrieved from http://www.mt-archive.info/MTS-2009-Blanchon.pdf.
Levenberg et al."Stream-based Translation Models for Statistical Machine Translation" Human Language Technologies: The 2010 Annual Conference of the North American Chapter of the ACL, Dec. 31, 2010, pp. 394-402.

(56) References Cited

OTHER PUBLICATIONS

Lagarda et al. "Statistical Post-Editing of a Rule Based Machine Translation System" Proceedings of NAACL HLT 2009: Short Papers, Jun. 2009, pp. 217-220.
Ehara, "Rule Based Machine Translation Combined with Statistical Post Editor for Japanese to English Patent Translation," MT Summit XI, 2007, pp. 13-18.
Bechara et al. "Statistical Post-Editing for a Statistical MT System" Proceedings of the 13th Machine Translation Summit, 2011, pp. 308-315.
"Summons to attend oral proceeding pursuant to Rule 115(1)(EPC)," European Patent Application 10185842.1, dated Aug. 11, 2017, 9 pages.
Westfall, Edith R., "Integrating Tools with the Translation Process North American Sales and Support," Jan. 1, 1998, pp. 501-505, XP055392884. Retrieved from the Internet: <URL:https://rd.springer.com/content/pdf/10.1007/3-540-49478-2_46.pdf>.
"Summons to attend oral proceeding pursuant to Rule 115(1)(EPC)," European Patent Application 09179150.9, dated Dec. 14, 2017, 17 pages.
"Decision to Refuse," European Patent Application 10185842.1, dated Mar. 22, 2018, 16 pages.
"International Search Report" and "Written Opinion of the International Searching Authority," Patent Cooperation Treaty pplication No. PCT/US2018/067213, dated Mar. 25, 2019, 7 pages.

\* cited by examiner

| French | | English |
|---|---|---|
| Cet | — | This |
| acte | — | act |
| s' | | applies |
| applique | | to |
| à | | Iceland |
| l' | | for |
| Islande | | the |
| dans | | areas |
| les | | referred |
| secteurs | | to |
| visés | | in |
| au | | paragraph |
| paragraphe | | 2 |
| 2 | | of |
| de | | the |
| la | | Introductory |
| partie | — | Part |
| introductive | | |

*FIG. 7*

FRAGMENT RECALL AND ADAPTIVE AUTOMATED TRANSLATION

FIELD OF THE TECHNOLOGY

The present technology relates generally to computer automated translation, and more specifically, but not by limitation to fragment recall methods for use with translation memory, and adaptive machine translation systems and methods that utilize post-edits to update a machine translation engine.

SUMMARY OF THE PRESENT TECHNOLOGY

According to some embodiments, the present disclosure is directed to a method for automated translation, comprising: determining that an exact or fuzzy match for a portion of a source input cannot be found in a translation memory; performing fragment recall by: matching subsegments in the portion against one or more whole translation units stored in the translation memory; and matching subsegments in the portion against corresponding one or more subsegments inside the one or more matching whole translation units; and returning any of the one or more matching whole translation units and the one or more matching subsegments as a fuzzy match. In some embodiments, the method can comprise proposing translations of matching subsegments inside the one or more matching whole translation units using a fine-grained alignment between sub-segments of the translation units stored in the translation memory.

According to some embodiments, the present disclosure is directed to a method for providing adaptive machine translation, the method comprising: receiving post-edits to a machine translation of a first source segment having been translated from a source language to a target language, the post-edits being generated by a human translator; updating a machine translation engine that generated the machine translation with the post-edits to the machine translation; and translating, with the updated machine translation engine, a second source segment in such a way that the machine translation of the second source segment requires fewer post-edits that those required for the first source segment.

According to some embodiments, the present disclosure is directed to a system of automated translation, the system comprising: a translation memory; a translation interface; a processor; and a memory for storing executable instructions, the processor executing the instructions to: determine that an exact or fuzzy match for a portion of a source input cannot be found in the translation memory; perform fragment recall by: matching subsegments in the portion against one or more whole translation units stored in the translation memory; and matching subsegments in the portion against corresponding one or more subsegments inside the one or more matching whole translation units; and return to the translation interface any of the one or more matching whole translation units and the one or more matching subsegments as a fuzzy match.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 7 illustrates a translation unit that has gone through fine-grained alignment and source and target words have been aligned.

DETAILED DESCRIPTION

Figure 1:
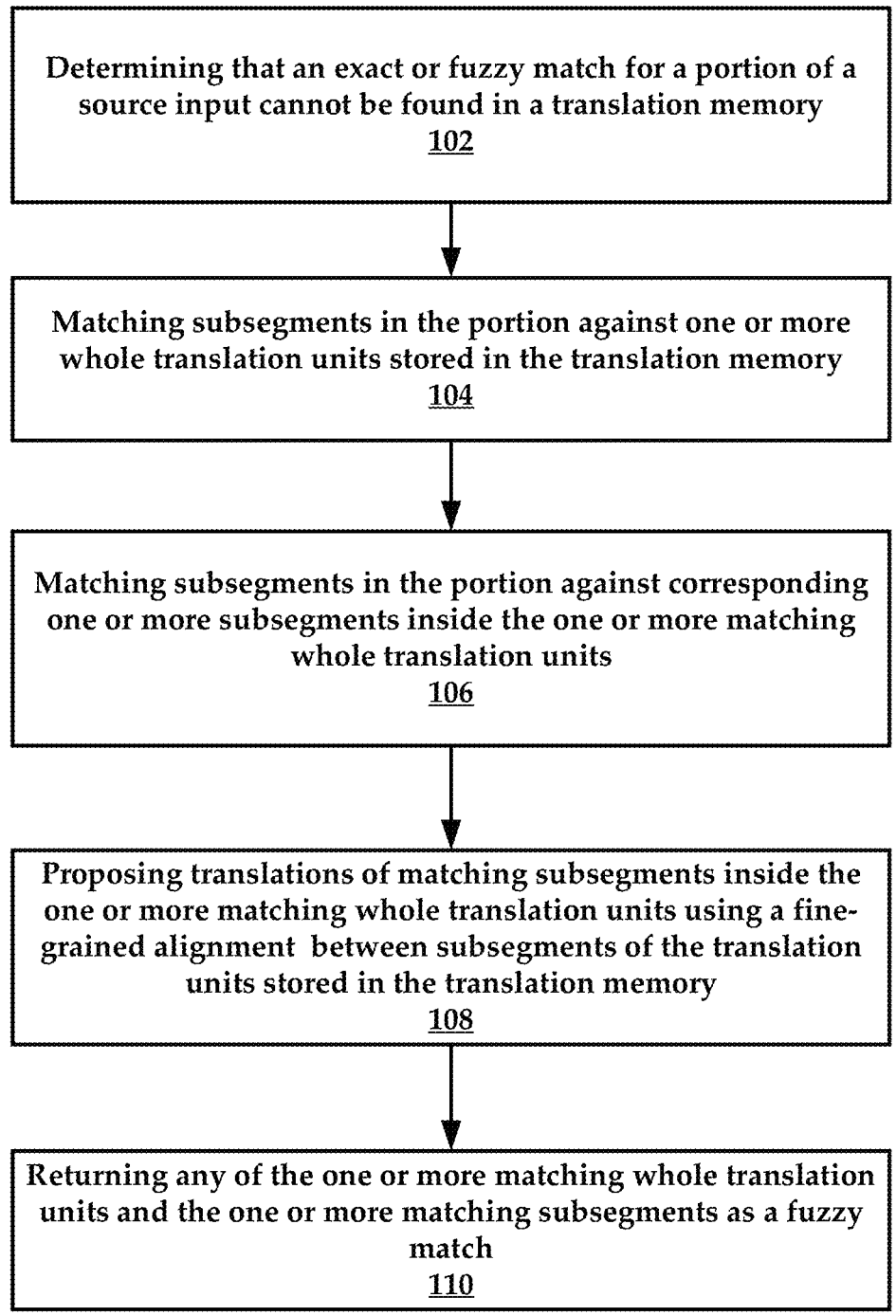
FIG. 1 is a flowchart of an example method of the present disclosure related to the use of an improved translation memory that leverages fragments.

For context, when working with translation memory, translators typically work through translation of a document and leverage content from the translation memory in various ways. Broadly speaking, several scenarios are encountered when translating content using a translation memory. One example includes "no match" which occurs when no translation memory match is found for a new segment (typically, a sentence) in a document the user is attempting to translate. Users can resort to various resources that help them create a translation for a "no match" faster, such as using terminology, suggestive dictionaries, and results from concordance searches—just to name a few.

In some instances, users who use machine translation sources can leverage machine translation 'fragments' while typing new content into translation application, or can post-edit entire machine translated segments. Still, despite all these remedies, editing a "no match" can require an undesirable and significant amount of time.

In another scenario, a "fuzzy match" occurs when a translation memory match is found but the match needs to be edited more or less extensively to match the new source content. Again, users have similar resources as cited above to complete the translation. The higher the fuzzy match value, the lower the editing effort. Typically translation managers and translators in the supply chain agree on a pricing scheme around an estimated effort required to edit such fuzzy matches versus no matches. Fuzzy matches are typically less expensive to process than no matches.

In yet another scenario, an "exact match" occurs when an exact translation memory match is found. This typically requires a lightweight review to ensure the translation fits the current document context. Again the supply chain typically agrees on reduced prices for such matches. Exact matches are the main source of productivity increases and cost savings today.

In light of the above, it is clear that great potential for additional productivity increases and cost savings is in both the "no match" and "fuzzy match" scenarios. Despite all the development efforts in the computer automated tool space, no solutions exist which allow users to effectively, efficiently, and accurately translate no match and fuzzy matches. Against this background, the present disclosure includes systems and methods that provide translators with a best possible match in each of these translation scenarios.

The solutions described herein involve both translation memory (TM) and machine translation (MT) space. Both solutions focus specifically on "no match" and "fuzzy match" scenarios in an effort to drive translation productivity.

Fragment Recall

Generally speaking, with respect to no match translations, the present disclosure provides systems and methods that conduct subsegment/fragment recall, where recalled fragments (e.g., subsegments) from translation memory can be used to speed up translation of new source content to be translated.

In other embodiments, no match scenarios can be processed and translated using an adaptive machine translation process. Generally speaking, this involves self-learning machine translation systems and methods where an MT engine adapts in real time to terminology and style of the translator. These adaptations are based on individual post-edited segments (e.g., corrections to a machine translation performed by a human translator). While speeding up editing of new machine translated content, adaptive machine translation also addresses one of a key concern for using MT, which includes human translators having to correct same or similar mistakes over and over again. The adaptive machine translation engine learns from the translator and thus errors are reduced significantly over time.

In yet another embodiment, "fuzzy match" scenarios can be processed using a translation memory repair process. Using the adaptive or dynamic translation memories of the present disclosure, fuzzy matches are no longer viewed as static but can now be repaired with recalled fragments and other translation sources, such as termbases and machine translation.

With respect to instances where no translation and/or fuzzy matches are encountered when using a TM, the translation memory application of the present disclosure can leverage segment "fragments" (sometimes also referred to as subsegments) from TM. By leveraging fragments recalled from the TM, translators can work on both match types in a more efficient manner.

FIG. 1 illustrates an example method of the present disclosure related to the use of an improved translation memory that leverages fragments. The method includes a step 102 of determining that an exact or fuzzy match for a portion of a source input cannot be found in a translation memory. Based on this determination, the method further includes performing fragment recall by a step 104 of matching subsegments in the portion against one or more whole translation units stored in the translation memory, as well as a step 106 of matching subsegments in the portion against corresponding one or more subsegments inside the one or more matching whole translation units.

In some embodiments, the method can include a step 108 of proposing translations of matching subsegments inside the one or more matching whole translation units using a fine-grained alignment between subsegments of the translation units stored in the translation memory.

Finally, the method includes a step 110 of returning any of the one or more matching whole translation units and the one or more matching subsegments as a fuzzy match.

By way of non-limiting example, a source input to be translated includes The Check Spelling Command. The translation memory finds an existing English-German translation unit as follows: Source: Check Spelling . . . ; and Target: Rechtschreibung prüfen . . . .

Figure 2:
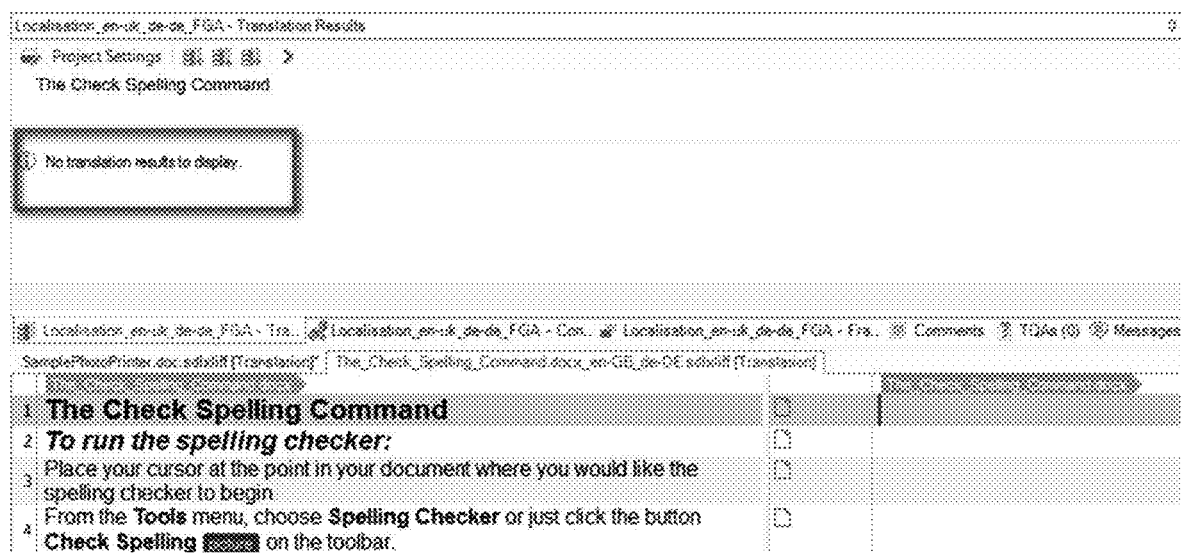
FIG. 2 illustrates a graphical user interface (GUI) of a translation memory application where no match is found for a source input.

In this example, with default settings for fuzzy matching, no match is found in the TM at the subsegment level, which produces a "no match" scenario. Indeed, with legacy TM technology, the user is presented with a no match as illustrated in FIG. 2.

In response, the user would start typing and can potentially resort to various productivity features that currently exist. For instance, the user could start a concordance search for Check Spelling and then manually find the translation unit Check Spelling . . . /Rechtschreibung prüfen . . . and copy, paste, or type this concordance match into the translation interface.

Another option involves the translator performing a quick add of a term to the termbase so that it gets offered through term recognition. However, several manual steps are required to perform such tasks, ultimately slowing the user down.

Figure 3:
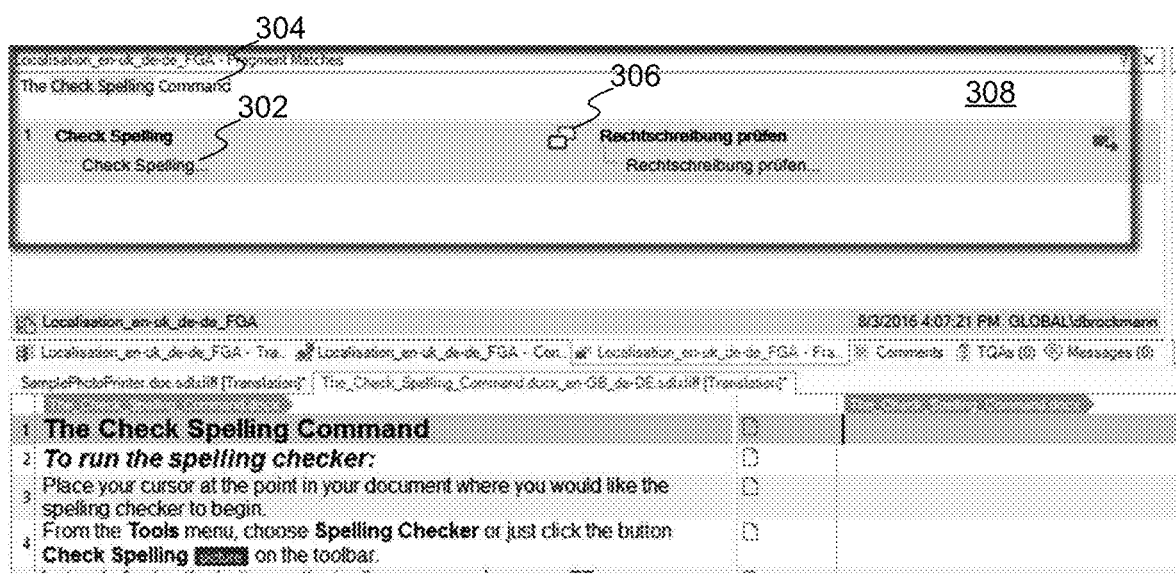
FIG. 3 illustrates a GUI of a translation memory application (translation program interface) that provides fragment recall against whole translation units.

Instead, the present disclosure provides systems and methods for fragment recall against whole translation units. Using the present disclosure, such fragments are identified automatically without user interaction and presented to the user for use in the new translation via the translation program interface, as illustrated in FIG. 3.

To assist the translator, a matching fragment (Check Spelling 302) in the new source input/segment (The Check Spelling Command 304) is highlighted, and a specific symbol 306 is used in a Fragment Matches window 308 to inform the translator that a fragment has been matched against a whole translation unit. Also the translator can review the matching translation unit for further context. Incidentally, the additional punctuation (" . . . ") is removed automatically in the matching process so that the translation unit can be matched up as a whole despite the punctuation.

Figure 4:
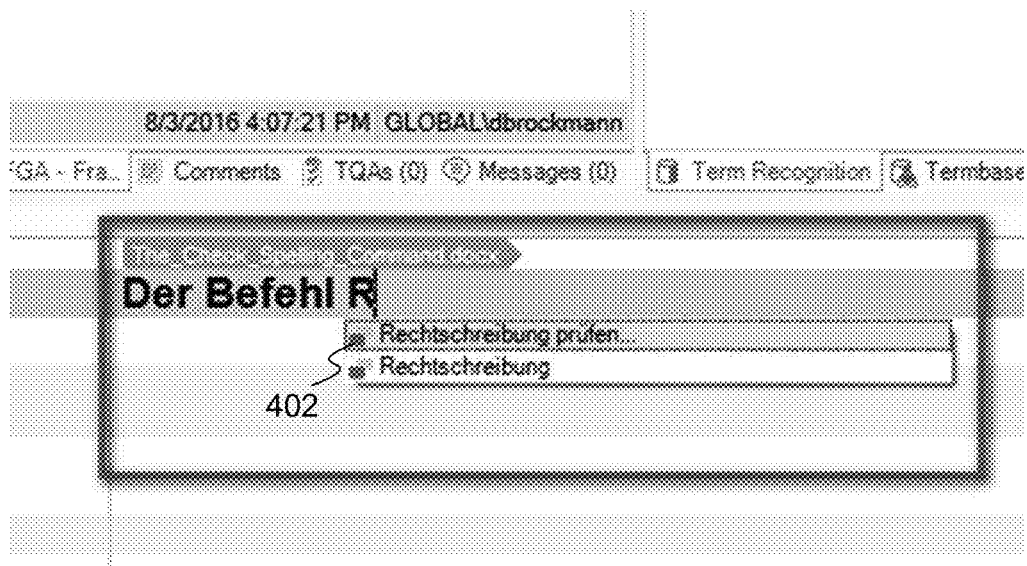
FIG. 4 illustrates a GUI of a translation memory application providing autosuggest features.

The translation program interface also provides autosuggest features. The translator can now start typing the source input desired and a fragment will be offered to them in AutoSuggest as they type as illustrated in FIG. 4.

An AutoSuggest icon 402 aids the translator in distinguishing this source of AutoSuggest from others, such as matches from an AutoSuggest dictionary or a termbase.

Figures 5, 6:
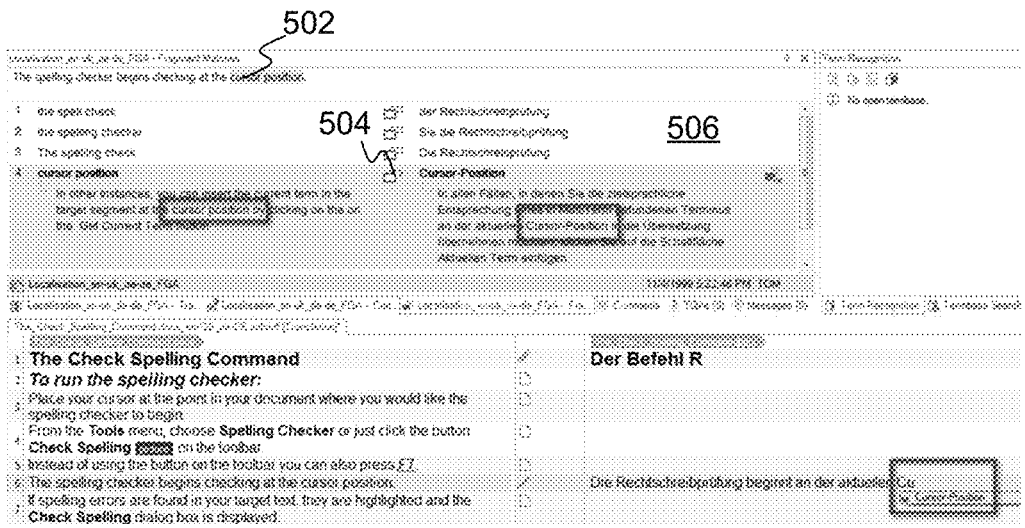
FIG. 5 illustrates a GUI of a translation memory application providing fragment recall at the translation unit (TU) fragment (subsegment) level.
FIG. 6 illustrates an example batch processing parameter graph illustrating fragment words in terms of both whole TUs and TU fragments.

While the above method describes a useful development, the present disclosure provides additional levels of granularity in fragment recall. For example, fragments in new translation requests (source input in a source language) can now be matched against corresponding fragments (subsegments) from existing translation units, rather than whole translation units. Consider the following example where a fragment of interest 502, as illustrated in FIG. 5, is highlighted. The source input to be translated includes The spelling checker begins checking at the cursor position. The translation memory contains the following translation unit: In other instances, you can insert the current term in the target segment at the cursor position by clicking on the Get Current Term button with the translation: In allen Fällen, in denen Sie die zielsprachliche Entsprechung eines in Multi-Term gefundenen Terminus an der aktuellen Cursor-Position in die Übersetzung übernehmen möchten, klicken Sie auf die Schaltfläche Aktuellen Term einfügen.

In this instance, using fragment recall at the translation unit (TU) fragment (subsegment) level, the translator will be able to retrieve the translation for cursor position as illustrated in FIG. 5.

Again, a specific symbol or icon 504 is used in the fragment matches window 506 to inform the user that a TU fragment match has been found, rather than an entire TU. This indicates a potentially lower quality in the recalled fragment, as it is more difficult for the translation memory application to identify matching TU fragments than it is to identify whole translation units.

The use of fragment recall provides simpler TM leverage because fragment matches come directly from the translation memory. This process allows for fewer concordance searches, decreased effort with terminology, and AutoSuggest dictionaries.

Also, the translation memory can now be used as a lightweight termbase. By leveraging fragments from whole translation units, translation memories start working more like termbases. For example, it is assumed that short segments are in fact terms. However, so far, these terms could not be leveraged easily, only through concordance search, for example. By leveraging subsegments directly as fragments from whole TUs, they now can be reused more quickly and intuitively. In some embodiments, the user can add such TUs into a termbase directly so that the subsegments are shown as known terms in future, and metadata can be added to describe the terms in more details.

The fragment recall translation memory methods and systems described herein save time and effort, as no extraction is required. Newly added translations are available immediately for fragment recall. At the same time, new settings and mechanisms are available for translation memories to keep the fragment recall functionality as healthy as possible.

The fragment recall translation memory methods and systems described herein also provide higher confidence. With the above user interface enhancements, it is very easy to identify fragment matches and their quality, giving translators increasing confidence in the accuracy of their translations.

In some embodiments, the fragment recall systems and methods can be used in batch processing of translations. Thus, while the above use cases consider interactive translation, batch processing can be executed where a number of matching words in fragments recalled from whole TUs and TU fragments are determined. The two types of fragments are counted as separate categories as they reflect different levels of quality. This can serve as a basis for the translators in a translation project to know what benefits to expect from the use of fragment recall, both in terms of productivity increase and potential cost savings. FIG. 6 illustrates an example batch processing parameter graph illustrating fragment words in terms of both whole TUs and TU fragments.

According to some embodiments, the fragment and/or fuzzy match processes (described in greater detail infra) can be optimized or fine-tuned. Fragment recall and fuzzy match repair are based on a concept referred to as fine-grained alignment. Since a TM contains pairs of aligned segments, generally referred to as translation units, operations at the segment level are straightforward, such as fuzzy matching a segment and retrieving a stored translation.

Operations below segment level are more challenging, such as matching just part of a TU segment (e.g. a phrase or term within a sentence) and retrieving the corresponding part of the translation. Processes like this require establishment of an alignment between parts of the TU source and target segment, which is a more fine-grained alignment. FIG. 7 illustrates a translation unit that has gone through fine-grained alignment and source and target words have been aligned.

Matching fragments against whole translation units is available for translators without any extra work. The TM searches of the systems and methods disclosed have been enhanced to perform a search for whole TUs that may match a fragment in a new segment.

Figure 8:
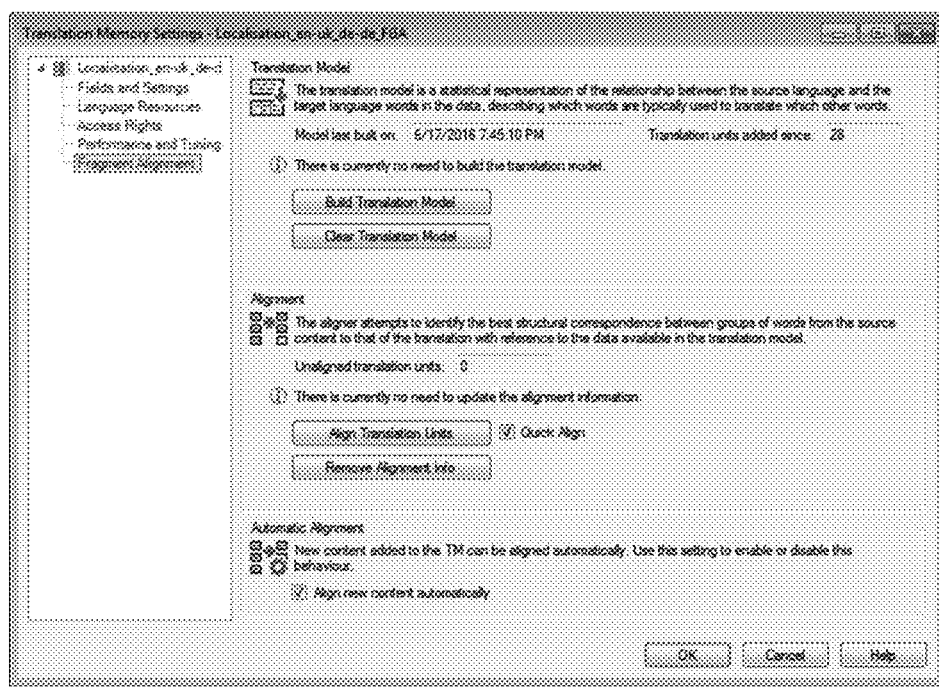
FIG. 8 illustrates a fine-grained alignment (FGA) process.

Fragment recall against fragments from translation units requires additional considerations. Converting a legacy translation memory into one that uses such fine-grained alignment (FGA), the translator first opens the TM application in the translation memories view, as illustrated in FIG. 8. As a second step, the translator can turn on fragment searching. If the TM has more than 1,000 translation units, new settings become available to perform fine-grained alignment on the existing translations. Once fragment searching has been enabled in a TM and the translation units have been aligned, it can be used fully for both types of fragment recall described herein.

Fine-grained alignment of TM content proceeds in two stages, in some embodiments. A first stage involves statistically analyzing the content of the TM, or the content of a pre-existing large parallel corpus having the same language pair, so as to construct a translation model representing the statistical associations between source and target language words. The second stage involves using that model to compute the most likely alignments between source and target language words or spans of words in each translation unit in the TM, where such alignments indicate that word or word span $w_s$ in the source language is translated by word or word span $w_t$ in the target language.

As mentioned above, the present disclosure also provides for fuzzy match repair in order to improve the operation and usability of a translation memory.

Once fine-grained alignment capabilities have been added to a translation memory, new interesting possibilities become available not just for recalling fragments. One of the most interesting new areas is to use fine-grained alignment, and other translation sources, such as termbases or machine translation, to actively "repair" (e.g., optimize) fuzzy matches.

Figure 9:
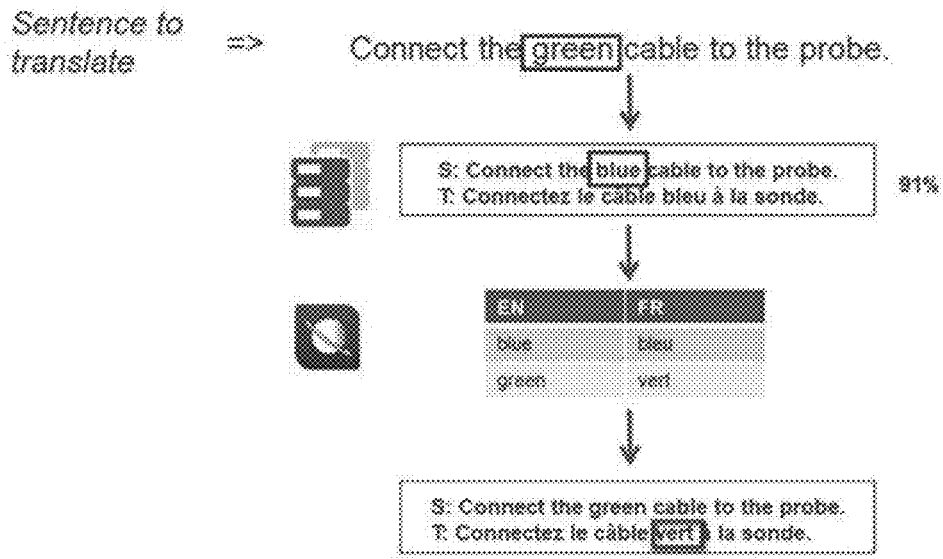
FIGS. 9 and 10 collectively illustrate a process of fuzzy match repair and termbase replacement.
Figure 10:
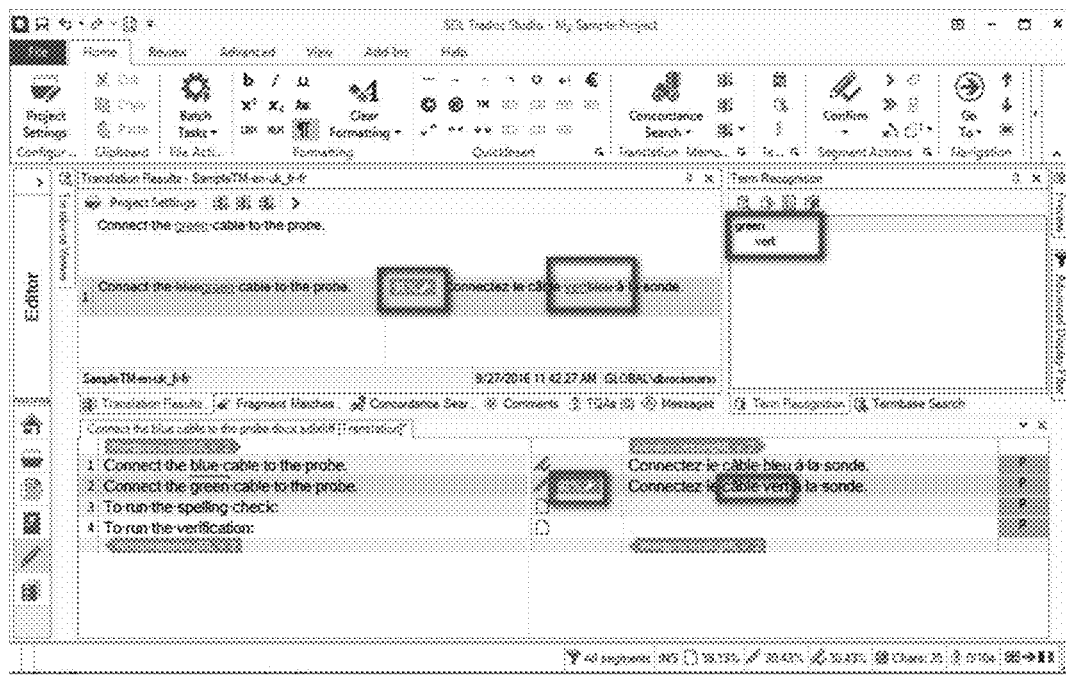

Fuzzy match repair (FMR) is generally understood to mean a process of improving TM fuzzy matches, by examining mismatched source content and altering the corresponding parts of the retrieved translation so as to produce a more useful translation suggestion. An example improvement is described with reference to FIGS. 9 and 10.

In this example, a source unit sentence to translate contains the word green, while the matched TU contains the word blue. Since there is a termbase containing the term blue and a translation for it, bleu, fuzzy match repair (FMR) can deduce that the non-relevant part of the translation suggestion is the word bleu. Since the termbase also contains green and a translation for it, further FMR can replace bleu in the translation with vert, and thus produce a translation that is more useful to the translator.

FMR can draw from a number of translation sources to perform fuzzy match repair such as a termbase (as in the example above); new translation memories (with fine-grained alignment information), which are used to repair fuzzy matches by inserting recalled fragments into the changed content in a fuzzy match; legacy translation memories (without fine-grained alignment information), which can be used to repair punctuation in a fuzzy match, for instance; and machine translation.

FMR is enhanced when using a TM with fine-grained alignment information. This is because the TM used will contain fragments that are relevant to the current translation context and will therefore likely produce better results than generic machine translation. Of course, termbases are also very useful as exemplified above.

Another example use case is provided for clarity of description. In this example, a sentence to translate (source input in source language) is To run the verification. The TM contains a translation unit comprising, To run the spelling check, with the translation So führen Sie die Rechtschreibprüfung durch.

Figure 11:
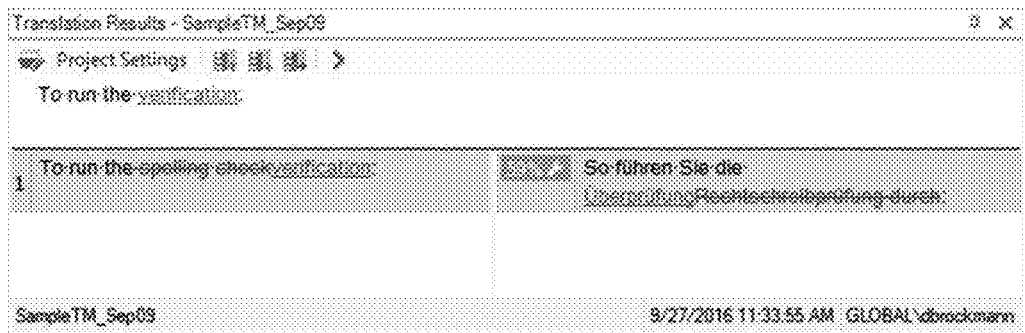
FIG. 11 illustrates a process of word replacement (e.g., repair) in a fuzzy match repair process.

In this instance, FMR will identify that spelling checker changed to verification requiring replacement of Rechtschreibprüfung. By analyzing the fine-grained alignment content in the same TM, the FMR finds that it can translate the fragment verification with the fragment Überprüfung using the same TM. However, due to replacing two words in the source (spelling check) with just one in the target (Überprüfung), the FMR will not be quite as perfect as in the example above, but generates: So führen Sie die Überprüfung: as illustrated in FIG. 11.

Figure 12:
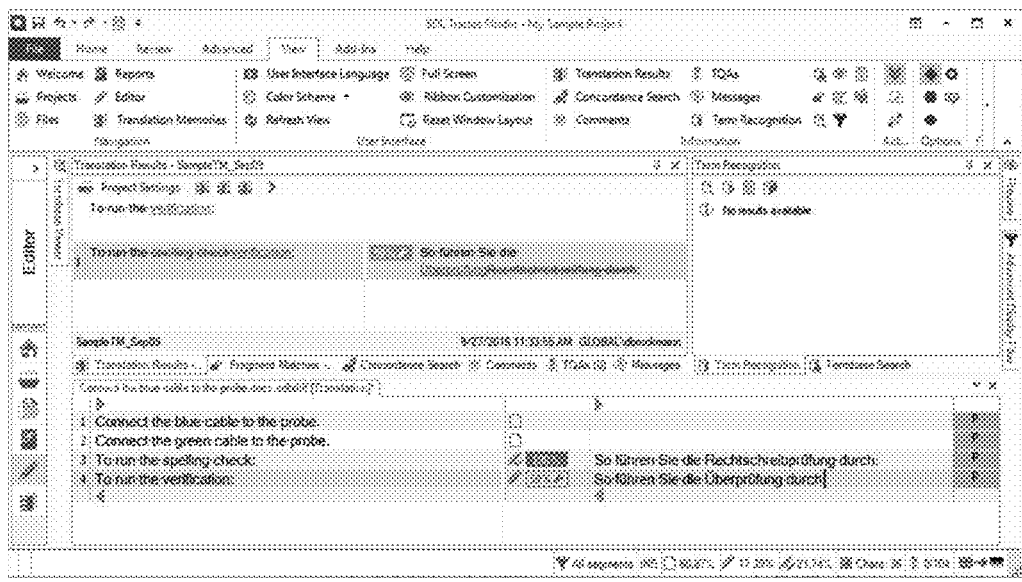
FIG. 12 illustrates additional editing by a translator of the output of the fuzzy match repair of FIG. 11.

Thus, further editing of the repaired fuzzy match is required to make it a perfect translation, and the translator needs to (re-)add durch to the target segment, as illustrated in FIG. 12.

In some embodiments, repaired fuzzy matches will require similar lightweight editing, as grammar and syntax changes. Thus, the translation of a fragment may not "slot" into a repaired fuzzy match fully and accurately. Against this background, the fuzzy match values in these cases will not be changed by the FMR so as not to set incorrect expectations, or even create false 100% matches that require editing. Rather other visual indicators, like a wrench symbol (next to a 59% value for instance in FIG. 12) in the fuzzy match value, are used to indicate a repaired fuzzy match.

In sum, an advantage of fuzzy match repair is that it allows a translator to complete work on fuzzy matches faster. Even though, in our example above, the translator needs to add durch to the repaired fuzzy match; this is a faster action than having to type Überprüfung into the fuzzy match.

As noted above, batch processing of translations can be effectuated, in addition to the interactive translation changes explained above. A column in the FMR GUI shows a number of words that are used to repair fuzzy matches. This again can serve as a basis for negotiations between translation managers and translators in terms of expected productivity increases and potential cost savings.

In general, FMR provides advantages over existing translation memories such as less editing time for fuzzy matches. Fuzzy matches are useful, but so far have required more or less extensive editing. This is a manual process and translators have to draw on additional resources manually. With FMR of the present disclosure translators can get more out of their resources with no extra intervention. This means translators can work faster with fewer post-edits to fuzzy matches.

These methods also lower translation cost relative to the impact that repaired fuzzy matches have on the time required to post edit fuzzy matches. Translators can complete more work, thereby securing or enhancing their margins. Translation managers can realize cost savings.

Adaptive/Dynamic Machine Translation

As mentioned above, adaptive machine translation (AMT), often also referred to as "self-learning" machine translation, comprises a self-learning MT engine that adapts to terminology and style of the translator, based on each individual post-edited segment that is transmitted to the engine. In some embodiments, this can occur in in real time. A post-edit will be understood to include a manual repair of a translation match found by a machine translation system. This repair is performed to correct a defect in the translation match.

While speeding up editing of new machine translated content, the self-learning MT engine also addresses concerns for using MT in a translation productivity environment, which includes having to correct the same mistakes over and over again. The self-learning MT engine learns from the translator and thus errors are reduced significantly over time.

For context, in general MT systems, post-edits are ignored as the MT engine, even if it has been trained, is static and cannot adapt to any changes the translator makes over time. In addition to reducing productivity, this causes frustration for the translator as the same mistakes are repeated again and again by the MT.

In accordance with the present disclosure, any post-edit done by a translator is incorporated by the self-learning MT engine as it is based on an adaptive model.

In this way, translators can update the self-learning MT engines as they go along with new suggestions. This in turn may mean that MT technology may well be accepted more readily than previously.

In the following example a comparison will be drawn between a translation flow using a static MT engine and the same translation using an adaptive MT engine (self-learning MT engine) of the present disclosure.

The following five sentences are translated from English to French: Refer to the electrical circuit diagrams and check the driver front side impact sensor; Refer to the electrical circuit diagrams and check that the driver front side impact sensor is working properly; Check the cable connection of the driver front side impact sensor; Refer to the electrical circuit diagrams to learn more about the driver front side impact sensor; Refer to the electrical circuit diagrams to learn more about the speed sensor.

The following output is generated by a static MT engine: (1) Reportez-vous à la schémas des circuits électriques et vérifier le capteur de choc latéral avant conducteur; (2) Reportez-vous à la schémas des circuits électriques et vérifier que le capteur de choc latéral avant conducteur fonctionne correctement; (3) Vérifiez la connexion du câble du capteur choc latéral avant conducteur; (4) Reportez-vous à la schémas des circuits électriques pour en savoir plus sur le capteur de choc latéral avant conducteur; (5) Reportez-vous à la schémas des circuits électriques pour en savoir plus sur le capteur de vitesse. The underlined language indicates errors that require post-editing.

Even though a translator will post-edit segment 1 to correct the terminology and grammar, the static MT engine will repeat the same mistakes in segments 2 to 5, requiring the same post-edits each time.

It will now be assumed that a translator can progressively post-edit segments, sending back the feedback to a self-learning MT engine that corrects the output in real-time. This will result in the following flow of segments: (1) Reportez-vous à la schémas des circuits électriques et vérifier le capteur de choc latéral avant conducteur.

The translator post-edits this to: Reportez-vous aux schemas électriques et vérifiez le capteur d'impact latéral avant conducteur.

With this feedback sent back to the self-learning MT engine, the self-learning MT engine will produce the following segment 2, where corrected mistakes are now highlighted in green: (2) Reportez-vous aux schémas électriques et vérifier que le capteur d'impact latéral avant conducteur fonctionne correctement. While two mistakes from segment 1 are now corrected, the change to "vérifiez" has not yet been effectuated. Thus, in some cases, more than one edit of the same kind is required for a correction to be effectuated with the self-learning MT engine. If the translator keeps making similar changes, the self-learning MT engine will eventually use "vérifiez" in such constructs. So, in our example, only one change—instead of three before—is required to correct the translation to: Reportez-vous aux schémas électriques et vérifiez que le capteur d'impact latéral avant conducteur fonctionne correctement.

Next, segment 3 is translated as Vérifiez la connexion du câble du capteur d'impact latéral avant conducteur. This requires no post-editing.

Here, no post-edit is required and the translation can be confirmed as is.

Next, segment 4 is translated as Reportez-vous aux schémas électriques pour en savoir plus sur le capteur d'impact latéral avant conducteur. Again, no post-edit is required.

Next, segment 5 is translated as Reportez-vous aux schémas électriques pour en savoir plus sur le capteur de vitesse. Again, no post-edit is required.

In this example, using the static engine, eight post-edits are required to correct the same mistakes several times. By contrast, using the self-learning MT engine of the present disclosure, only three post-edits are required.

In some embodiments, both TM and self-learning MT engine can be utilized in combination. For instance, if a TM was used in this example in addition to the self-learning MT engine, it would typically produce fuzzy matches requiring potentially less editing efforts.

In some embodiments, the self-learning MT engine application can allow a translator to specifically indicate that they desire to update the self-learning MT engine. This could be a selectable option that can be utilized through an interface that provides translation capabilities that utilize the self-learning MT engine of the present disclosure.

Figure 13:
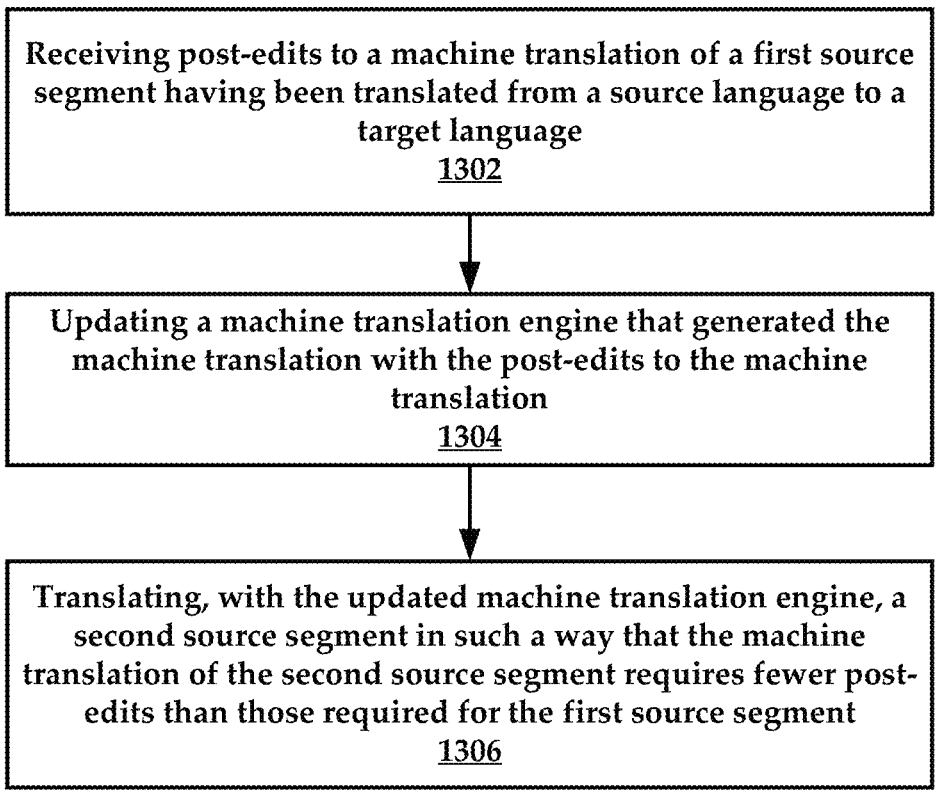
FIG. 13 is a flowchart of an example method for adaptive machine translation.

FIG. 13 is a flowchart of an example method for adaptive machine translation. In some embodiments, the method comprises a step 1302 of receiving post-edits to a machine translation of a first source segment having been translated from a source language to a target language. To be sure, the post-edits are generated by a human translator.

Next, the method includes a step 1304 of updating a machine translation engine that generated the machine translation with the post-edits to the machine translation, as well as a step 1306 of translating, with the updated machine translation engine, a second source segment in such a way that the machine translation of the second source segment requires fewer post-edits than those required for the first source segment.

As noted above, FMR can leverage AutoSuggest dictionaries as an additional translation source. Also, origin tooltips can be implemented to note the origin of a repair, so that users can fine-tune the behavior based on optimizing the resources used for repairing fuzzy matches.

These features described herein can also be implemented as a cloud service that can leverage self-learning MT engine features, cloud-based translation memories as well as cloud-based terminology repositories to calculate a best possible match requiring the least editing effort.

Figure 14:
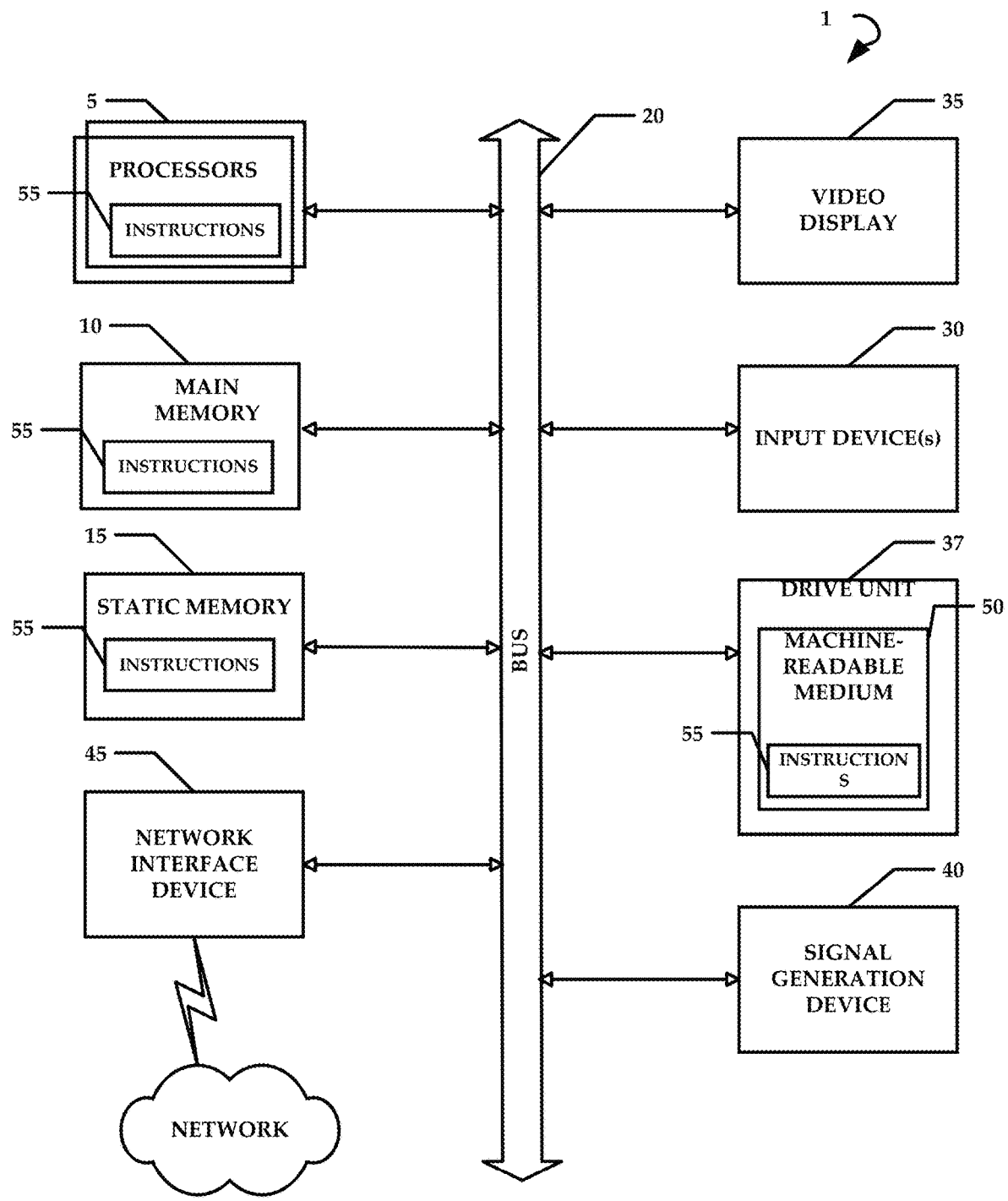
FIG. 14 illustrates an exemplary computing system that may be used to implement embodiments according to the present technology.

FIG. 14 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for automated translation, comprising:
   determining that neither an exact match nor a fuzzy match for a portion of a source input in a source language can be found in a translation memory;
   performing fragment recall by:
      matching subsegments in the portion against one or more whole translation units stored in the translation memory, the matches coming directly from the translation memory;
      matching subsegments in the portion against corresponding one or more subsegments inside the one or more matching whole translation units; and
      proposing translations of matching subsegments inside the one or more matching whole translation units by utilization of a fine-grained alignment between subsegments of the translation units stored in the translation memory, the fine-grained alignment comprising:
         constructing a translation model representing statistical associations between source and target language words; and
         using the translation model to compute the most likely alignments between source and target language words in each translation unit in the translation memory; and
      returning any of the one or more matching whole translation units and the one or more matching subsegments in a target language as a fuzzy match.

2. The method according to claim 1, further comprising providing the one or more matching subsegments as an autosuggestion in a translation program interface when a user types the source input into the translation program interface.

3. The method according to claim 1, further comprising displaying the one or more matching whole translation units in both a source language version that corresponds to a language of the source input, as well as a target language version.

4. The method according to claim 1, further comprising tracking a number of subsegments utilized from the one or more matching subsegments and the one or more matching whole translation units.

5. The method according to claim 1, further comprising tracking a number of subsegments utilized from the one or more matching subsegments and the one or more matching subsegments inside the one or more matching whole translation units.

6. The method according to claim 1, wherein the fragment recall further comprises utilization of a fine-grained alignment between subsegments of the translation units stored in the translation memory, in order to propose translations of matching subsegments inside the one or more matching whole translation units.

7. The method according to claim 1, further comprising:
evaluating mismatched subsegments;
locating correct translations for the mismatched subsegments; and
replacing the mismatched subsegments with replacement subsegments that correspond to the correct translations.

8. The method according to claim 7, wherein the correct translations are located from a termbase or machine translations.

9. A system of automated translation, the system comprising:
a translation memory;
a translation interface;
a processor; and
a memory for storing executable instructions, the processor executing the instructions to:
  determine that neither an exact match nor a fuzzy match for a portion of a source input in a source language can be found in the translation memory;
  perform fragment recall by:
    matching subsegments in the portion against one or more whole translation units stored in the translation memory, the matches coming directly from the translation memory;
    matching subsegments in the portion against corresponding one or more subsegments inside the one or more matching whole translation units; and
    proposing translations of the matching subsegments inside the one or more matching whole translation units by utilization of a fine-grained alignment between the matching subsegments of the translation units stored in the translation memory, the fine-grained alignment comprising:
      constructing a translation model representing statistical associations between source and target language words; and
      using the translation model to compute the most likely alignments between source and target language words in each translation unit in the translation memory; and
    return to the translation interface any of the one or more matching whole translation units and one or more of the matching subsegments in a target language as a fuzzy match.

10. The system according to claim 9, wherein the processor further executes the instructions to provide the matching subsegments as an autosuggestion in the translation interface when a user types the source input into the translation interface.

11. The system according to claim 9, wherein the processor further executes the instructions to display the one or more matching whole translation units in both a source language version that corresponds to a language of the source input, as well as a target language version.

12. The system according to claim 9, wherein the processor further executes the instructions to track a number of subsegments utilized from the one or more matching subsegments and the one or more matching whole translation units.

13. The system according to claim 9, wherein the processor further executes the instructions to track a number of subsegments utilized from the one or more matching subsegments and the one or more matching subsegments inside the one or more matching whole translation units.

14. The system according to claim 9, wherein the fragment recall step further comprises utilization of a fine-grained alignment between subsegments of the translation units stored in the translation memory, in order to propose translations of matching subsegments inside the one or more matching whole translation units.

15. The system according to claim 9, wherein the processor further executes the instructions comprising:
evaluating mismatched subsegments;
locating correct translations for the mismatched subsegments; and
replacing the mismatched subsegments with replacement subsegments that correspond to the correct translations.

16. The system according to claim 15, wherein the processor further executes the instructions to obtain correct translations from a termbase or machine translations.

* * * * *